(12) United States Patent
Ichikawa et al.

(10) Patent No.: US 9,075,416 B2
(45) Date of Patent: Jul. 7, 2015

(54) MOBILE BODY

(75) Inventors: Kentaro Ichikawa, Sunto-gun (JP);
Toshiki Kindo, Yokohama (JP); Shigeki Sugano, Shinjuku-ku (JP); Taisuke Sugaiwa, Shinjuku (JP); Hiroyasu Iwata, Shinjuku-ku (JP)

(73) Assignees: TOYOTA JIDOSHA KABUSHIKI KAISHA, Aichi-ken (JP); WASEDA UNIVERSITY, Tokyo (JP)

( * ) Notice: Subject to any disclaimer, the term of this patent is extended or adjusted under 35 U.S.C. 154(b) by 44 days.

(21) Appl. No.: 13/825,230

(22) PCT Filed: Sep. 6, 2011

(86) PCT No.: PCT/JP2011/070293
§ 371 (c)(1),
(2), (4) Date: Mar. 20, 2013

(87) PCT Pub. No.: WO2012/039280
PCT Pub. Date: Mar. 29, 2012

(65) Prior Publication Data
US 2013/0184980 A1    Jul. 18, 2013

(30) Foreign Application Priority Data
Sep. 21, 2010  (JP) ................................. 2010-210960

(51) Int. Cl.
*G05D 3/12*   (2006.01)
*B25J 13/08*  (2006.01)
(Continued)

(52) U.S. Cl.
CPC ................. *G05D 3/12* (2013.01); *B25J 9/1676* (2013.01); *G05B 2219/39091* (2013.01);
(Continued)

(58) Field of Classification Search
CPC .......... B25J 9/162; B25J 9/1676; B25J 13/08; G05B 2219/39091; G05B 2219/40198; G05B 2219/40203; G05D 1/02; G05D 1/0246; G05D 1/0257; G05D 1/0274; G05D 3/12
USPC ...................................... 701/301; 901/46–47
See application file for complete search history.

(56) References Cited

U.S. PATENT DOCUMENTS 6,678,582 B2 * 1/2004 Waled ........................... 700/245
6,690,208 B2 * 2/2004 Gloden et al. ................. 307/326
(Continued)

FOREIGN PATENT DOCUMENTS

CN        1782736 A     6/2006
CN      101048296 A    10/2007
(Continued)

*Primary Examiner* — Mary Cheung
*Assistant Examiner* — Atul Trivedi
(74) *Attorney, Agent, or Firm* — Sughrue Mion, PLLC

(57) ABSTRACT

Disclosed is a mobile body which plans an avoidance operation of the mobile body and an expected avoidance operation which is expected of a mobile obstacle, thereby improving efficiency of the avoidance operation. A mobile body (1) which moves along an operation target includes mobile obstacle detection means (6) and (7) for detecting a mobile obstacle in the vicinity of the mobile body (1), approach determination means (15) for determining whether or not the mobile obstacle and the mobile body approach each other within a predetermined interval, and operation planning means (16) for, when the approach determination means (15) determines that the mobile obstacle and the mobile body (1) approach each other within the predetermined interval, planning the avoidance operation of the mobile body (1) and an expected avoidance operation which is expected of the mobile obstacle.

22 Claims, 20 Drawing Sheets

(51) Int. Cl.
  *G05D 1/02* (2006.01)
  *B25J 9/16* (2006.01)
(52) U.S. Cl.
  CPC .............. *B25J 13/08* (2013.01); *G05D 1/02* (2013.01); *B25J 9/162* (2013.01); *G05B 2219/40198* (2013.01); *G05B 2219/40203* (2013.01); *G05D 1/0246* (2013.01); *G05D 1/0257* (2013.01); *G05D 1/0274* (2013.01)

(56) References Cited

U.S. PATENT DOCUMENTS

| | | | |
|---|---|---|---|
| 6,941,199 B1* | 9/2005 | Bottomley et al. | 701/23 |
| 7,167,799 B1* | 1/2007 | Dolgov et al. | 701/301 |
| 7,409,295 B2* | 8/2008 | Paradie | 701/301 |
| 8,311,731 B2* | 11/2012 | Sugiura et al. | 701/301 |
| 8,390,251 B2* | 3/2013 | Cohen et al. | 320/109 |
| 8,442,714 B2* | 5/2013 | Matsukawa et al. | 701/26 |
| 8,504,202 B2* | 8/2013 | Ichinose et al. | 700/255 |
| 8,577,591 B2* | 11/2013 | Schinerl | 701/301 |
| 8,762,044 B2* | 6/2014 | Kelly et al. | 701/301 |
| 8,930,019 B2* | 1/2015 | Allen et al. | 700/245 |
| 8,935,006 B2* | 1/2015 | Vu et al. | 700/264 |
| 2006/0031015 A1* | 2/2006 | Paradie | 701/301 |
| 2007/0192910 A1* | 8/2007 | Vu et al. | 901/17 |
| 2007/0199108 A1* | 8/2007 | Angle et al. | 901/17 |
| 2008/0002025 A1 | 1/2008 | Kakinami | |
| 2008/0040040 A1* | 2/2008 | Goto et al. | 701/301 |
| 2008/0281470 A1* | 11/2008 | Gilbert et al. | 700/259 |
| 2008/0312771 A1* | 12/2008 | Sugiura | 700/259 |
| 2009/0043440 A1* | 2/2009 | Matsukawa et al. | 701/25 |
| 2009/0074252 A1* | 3/2009 | Dariush et al. | 382/107 |
| 2009/0118863 A1* | 5/2009 | Dariush | 700/255 |
| 2009/0254235 A1* | 10/2009 | Kuroda | 701/23 |
| 2009/0326713 A1* | 12/2009 | Moriya | 700/255 |
| 2010/0217528 A1* | 8/2010 | Sato et al. | 701/301 |
| 2011/0153081 A1* | 6/2011 | Romanov et al. | 700/255 |
| 2011/0202175 A1* | 8/2011 | Romanov et al. | 700/250 |
| 2011/0288684 A1* | 11/2011 | Farlow et al. | 700/264 |
| 2013/0231855 A1* | 9/2013 | Mcaree et al. | 701/301 |
| 2014/0067121 A1* | 3/2014 | Brooks et al. | 700/255 |
| 2014/0219507 A1* | 8/2014 | Ghose et al. | 382/104 |
| 2014/0277868 A1* | 9/2014 | Hillman et al. | 701/22 |

FOREIGN PATENT DOCUMENTS

| | | |
|---|---|---|
| JP | 63-150710 A | 6/1988 |
| JP | 2006-35381 A | 2/2006 |
| JP | 2006-232247 A | 9/2006 |
| JP | 2007-148524 A | 6/2007 |
| JP | 2008-137127 A | 6/2008 |

* cited by examiner

MOBILE BODY

CROSS REFERENCE TO RELATED APPLICATIONS

This application is a National Stage of International Application No. PCT/JP2011/070293 filed Sep. 6, 2011, claiming priority based on Japanese Patent Application No. 2010-210960 filed Sep. 21, 2010, the contents of all of which are incorporated herein by reference in their entirety.

TECHNICAL FIELD

The present invention relates to a mobile body, such as a robot, a manipulator, and a mobility device.

BACKGROUND ART

In the related art, Japanese Patent Application Laid-Open No. 2008-137127 has been known in the technical literatures in this field. This publication describes a robot control method in which, when it is predicted that an autonomous mobile robot and a human will come into contact with each other, the operation of the robot is restricted so as not to come into contact with a vital point of the human.

CITATION LIST

Patent Literature

Patent Literature 1: Japanese Patent Application Laid-Open No. 2008-137127

SUMMARY OF INVENTION

Technical Problem

On the other hand, in the related art, robot control has been performed such that, on the basis of the principle that the robot is not brought into contact with the human as little as possible, the operation of the human is given the highest priority and the robot avoids the operation of the human, or the operation of the robot is restricted. In the above-described robot control of the related art, when it is predicted that the robot will come into contact with the human, the operation of the robot is restricted in conformity with the human.

However, in the control of the related art in which the robot performs avoidance or the operation of the robot is restricted in a unilateral manner, a state where the robot is likely to come into contact with the human continuously occurs in a congested circumstance, whereby the robot may not execute a task efficiently.

Accordingly, an object of the invention is to provide a mobile body which plans an avoidance operation of the mobile body and an expected avoidance operation which is expected of a mobile obstacle, thereby performing a given task efficiently.

Solution to Problem

In order to attain the above-described object, the invention provides a mobile body which moves along an operation target. The mobile body includes mobile obstacle detection means for detecting a mobile obstacle in the vicinity of the mobile body, approach determination means for determining whether or not the mobile obstacle and the mobile body approach each other within a predetermined interval, and operation planning means for, when the approach determination means determines that the mobile obstacle and the mobile body approach each other within the predetermined interval, planning an avoidance operation of the mobile body and an expected avoidance operation which is expected of the mobile obstacle.

According to the mobile body of the invention, when the mobile obstacle, such as a human, approaches the mobile body within the predetermined interval (safety margin or the like), the mobile obstacle as well as the mobile body normally performs the avoidance operation. For this reason, the expected avoidance operation as an avoidance operation which is expected of the mobile obstacle is planned along with the avoidance operation of the mobile body, whereby an efficient avoidance operation can be performed compared to a case where the mobile body performs avoidance in a unilateral manner, and a given task can be performed efficiently.

It is preferable that the mobile body of the invention further includes alert operation planning means for planning an alert operation to the mobile obstacle on the basis of the expected avoidance operation planned by the operation planning means.

According to the mobile body of the invention, the alert operation which causes the mobile obstacle to perform the expected avoidance operation is executed, thereby increasing the possibility that the mobile obstacle understands the intention of the mobile body to perform the expected avoidance operation. The mobile body performs the avoidance operation corresponding to the expected avoidance operation, whereby concessions which are made between humans can be realized between the mobile body and the mobile obstacle. This enables efficient avoidance or passing each other with a small amount of operation.

It is preferable that the mobile body of the invention further includes contact tolerance calculation means for calculating contact tolerance of the mobile body with respect to the mobile obstacle, wherein the operation planning means plans the avoidance operation of the mobile body and the expected avoidance operation which is expected of the mobile obstacle on the basis of the contact tolerance calculated by the contact tolerance calculation means.

According to the mobile body of the invention, the avoidance operation and the expected avoidance operation are planned while permitting a certain degree of contact, whereby it is possible to allow a margin for the movement range of the mobile body compared to a case where no contact is permitted. For this reason, it becomes easy to make a plan such that the mobile body can move efficiently even in a congested environment.

It is preferable that the mobile body of the invention further includes contact tolerance calculation means for calculating contact tolerance of the mobile body with respect to the mobile obstacle, wherein the alert operation planning means plans an alert operation including a contact operation with the mobile obstacle on the basis of the contact tolerance calculated by the contact tolerance calculation means.

According to the mobile body of the invention, if the alert operation including the contact operation with respect to the mobile obstacle is planned, an alert including contact is performed to a human who has his/her back turned or the like, and the human can be aware of the presence of the mobile body. A way to apply force or a contact direction is adjusted, whereby the mobile body can directly transmit a movement direction and the amount of movement, and an easy-to-transmit alert can be performed simply compared to non-contact communication.

It is preferable that the mobile body of the invention further includes priority relationship determination means for, when the approach determination means determines that the mobile obstacle and the mobile body approach each other within the predetermined interval, determining the priority relationship between the mobile obstacle and the mobile body, wherein the operation planning means plans the avoidance operation of the mobile body and the expected avoidance operation which is expected of the mobile obstacle on the basis of the determination result of the priority relationship determination means.

According to the mobile body of the invention, the operations are planned on the basis of the priority relationship between the mobile body and the mobile obstacle, whereby an appropriate operation plan according to circumstances can be made. Specifically, when the mobile obstacle is a person who carries a large load or an old person, it is determined that the mobile obstacle is given a higher priority, and an operation plan can be made such that the mobile body largely performs avoidance. When the mobile body is moving in an extremely urgent circumstance, such as medical treatment, it is determined that the mobile body is given higher priority, and an operation plan can be made such that the mobile obstacle largely performs avoidance.

It is preferable that the mobile body of the invention further includes priority relationship determination means for, when the approach determination means determines that the mobile obstacle and the mobile body approach each other within the predetermined interval, determining the priority relationship between the mobile obstacle and the mobile body, wherein the alert operation planning means plans the alert operation to the mobile obstacle on the basis of the determination result of the priority relationship determination means.

According to the mobile body of the invention, the alert operation is planned on the basis of the priority relationship between the mobile body and the mobile obstacle, whereby an appropriate alert operation according to circumstances can be planned. Specifically, an alert of weak assertion is performed for a mobile obstacle having priority, such as an old person, whereby the operation of the mobile obstacle can be given priority. When the mobile body is given priority, an alert of strong assertion is performed, whereby the mobile obstacle can take the expected avoidance operation, and the operation of the mobile body can be given priority.

It is preferable that the mobile body of the invention further includes priority relationship determination means for, when the approach determination means determines that the mobile obstacle and the mobile body approach each other within the predetermined interval, determining the priority relationship between the mobile obstacle and the mobile body, wherein the contact tolerance calculation means calculates the contact tolerance on the basis of the determination result of the priority relationship determination means.

According to the mobile body of the invention, since the contact tolerance can be calculated on the basis of the priority relationship between the mobile body and the mobile obstacle, contact with a mobile obstacle having priority, such as an old person, is avoided, whereby the operation of the mobile obstacle can be given priority. When the mobile body is given priority, contact is positively permitted, whereby the operation of the mobile body can be given priority.

It is preferable that the mobile body of the invention further includes affinity calculation means for, when the mobile obstacle is a human, calculating affinity of the human for the mobile body, wherein the operation planning means plans the avoidance operation of the mobile body and the expected avoidance operation which is expected of the human on the basis of the affinity calculated by the affinity calculation means.

According to the mobile body of the invention, the operations are planned on the basis of affinity of the human for the mobile body, whereby concessions can be realized without giving the human a sense of unease or a sense of discomfort. Specifically, when the mobile body is an autonomous mobile robot, since an old person tends to have low affinity for the robot, the robot largely performs avoidance, whereby preventing the old person from feeling a sense of unease or a sense of discomfort.

It is preferable that the mobile body of the invention further includes affinity calculation means for, when the mobile obstacle is a human, calculating affinity of the human for the mobile body, wherein the alert operation planning means plans the alert operation to the mobile obstacle on the basis of the affinity calculated by the affinity calculation means.

According to the mobile body of the invention, the alert operation can be planned on the basis of affinity of the human for the mobile body without giving the human a sense of unease or a sense of discomfort. Specifically, when the mobile body is an autonomous mobile robot, since an old person tends to have low affinity for the robot, an alert operation by contact or loud-volume voice is not performed, and an alert operation is not performed or a weak alert operation is only performed, thereby preventing the old person from feeling a sense of unease or a sense of discomfort.

It is preferable that the mobile body of the invention further includes operation target generation means for generating the operation target of the mobile body, and operation prediction means for predicting the operation of the mobile obstacle detected by the mobile obstacle detection means, wherein the approach determination means determines whether or not the mobile obstacle and the mobile body approach each other within the predetermined interval on the basis of the operation target generated by the operation target generation means and the operation of the mobile obstacle predicted by the operation prediction means.

According to the mobile body of the invention, the operation target of the mobile body and the predicted operation of the mobile obstacle are compared with each other, whereby it is possible to determine whether or not the mobile obstacle and the mobile body approach each other within the predetermined interval with high accuracy.

In the mobile body of the invention, it is preferable that the operation planning means plans the avoidance operation and the expected avoidance operation again on the basis of the deviation between the planned avoidance operation and the operation target generated by the operation target generation means and the deviation between the planned expected avoidance operation and the operation of the mobile obstacle predicted by the operation prediction means.

According to the mobile body of the invention, correction is performed on the basis of the deviation between the planned avoidance operation and the operation target of the mobile body and the deviation between the planned expected avoidance operation and the predicted operation of the mobile obstacle, whereby the operations can be planned so as to prevent the avoidance operation from being deviated from the operation target too much while preventing the expected avoidance operation from imposing excessive burden on the mobile obstacle.

In the mobile body of the invention, the operation planning means may plan a plurality of operation candidates of the mobile body based on the avoidance operation of the mobile body and the expected avoidance operation which is expected of the mobile obstacle, may predict the operation results of the plurality of operation candidates, and from among the plurality of operation candidates, may select an operation candidate for which it is predicted that the operation result will satisfy a predetermined constraint condition.

According to the mobile body of the invention, an operation candidate for which it is predicted that a predetermined constraint condition, such as an approach to the mobile obstacle or intensity of an alert, will be satisfied, is selected from among a plurality of operation candidates, whereby an inappropriate operation in practice, for example, an excessively intense alert operation can be suppressed, and an appropriate operation which satisfies the constraint condition can be performed.

The mobile body according to the invention may be an autonomous mobile robot.

The mobile body according to the invention may be a manipulator robot.

The mobile body according to the invention may be a personal mobility device.

Advantageous Effects of Invention

According to the invention, the avoidance operation of the mobile body and the expected avoidance operation which is expected of the mobile obstacle are planned, whereby a given task can be performed efficiently.

DESCRIPTION OF EMBODIMENTS

Figure 1:
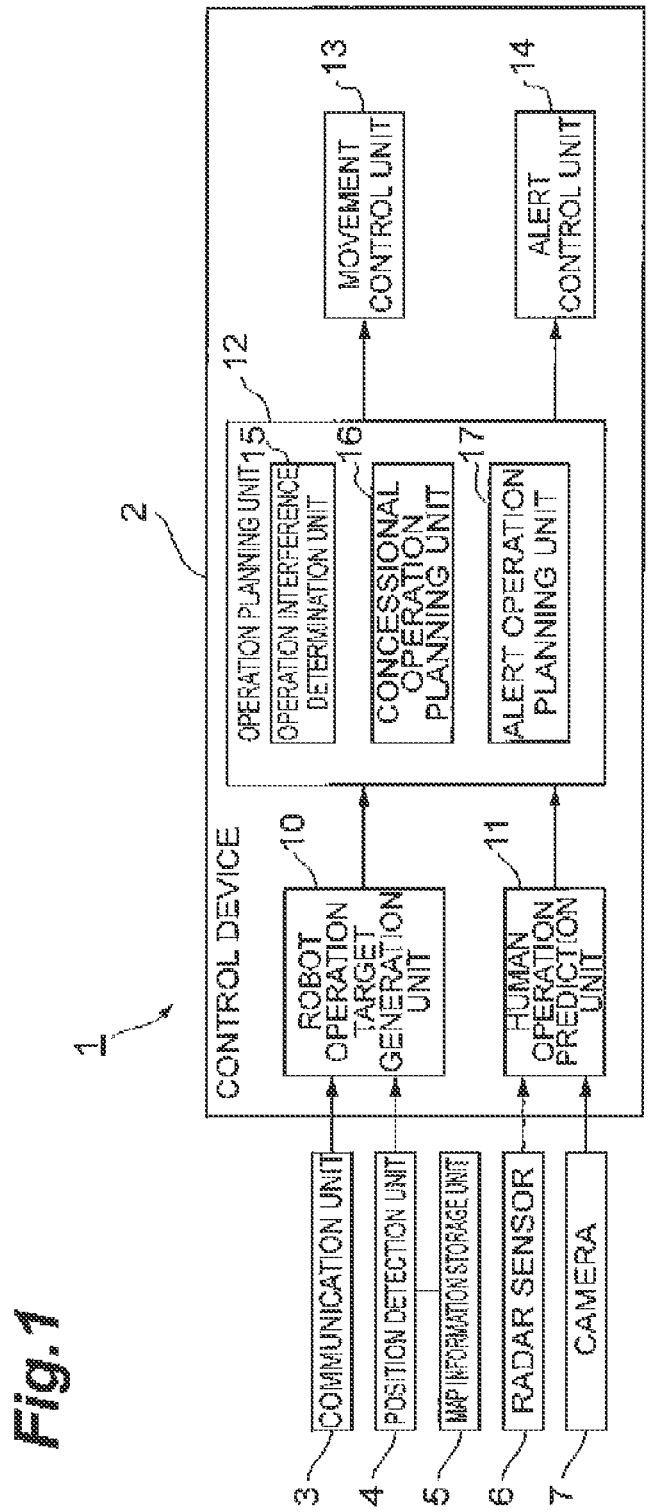
FIG. 1 is a block diagram showing the configuration of a first embodiment of a mobile body according to the invention.

Hereinafter, preferred embodiments of the invention will be described in detail with reference to the drawings. In the drawings, the same or similar portions are represented by the same reference numerals, and overlapping description will not be repeated.

First Embodiment

In a first embodiment, description will be provided using an autonomous mobile robot 1 as the mobile body of the invention. The purpose or form of the autonomous mobile robot 1 is not particularly limited. The autonomous mobile robot 1 may be a cleaning robot or a transportation robot car. A movement method of the autonomous mobile robot 1 may be by wheels, bipedal, or the like.

The autonomous mobile robot 1 plans an avoidance operation of the autonomous mobile robot and an expected avoidance operation which is expected of a human when an operation of the human and an operation of the robot interfere with each other, and performs an alert which causes the human to perform the expected avoidance operation, whereby concessions which are made between humans are realized between the human and the robot. According to the autonomous mobile robot 1, the operation target of the autonomous mobile robot can be attained by concessions with peripheral humans even in a congested environment, and the coexistence of the human with the robot can be realized.

That is, normally, humans can freely move well even in a severely congested circumstance. Meanwhile, it is well known that, at the time of disaster, bunching (trapped state) occurs between humans everywhere, and well-ordered movement is important so as to avoid the bunching. This suggests that humans smoothly move in a densely packed state because concessions are constantly performed even if the humans are unaware of concessions. For this reason, concessions which are made between humans are introduced during the operations of the human and the robot, whereby an efficient avoidance operation is realized.

It is considered that the concessions between the robot and the human are established by three steps in which (A) the human understands the intention of the robot, (B) the robot understands the intention of the human, and (C) the deviation between the intentions of the human and the robot is adjusted. When realizing concessions, it is important to allow the human to understand the intention of the robot. That is, it is preferable that the robot subjectively determines what is the relationship when the robot and the human pass each other and how the relationship is asserted for the human, and behaves in accordance with the determination result.

Accordingly, the autonomous mobile robot 1 plans the avoidance operation of the autonomous mobile robot and the expected avoidance operation which is expected of the human, and then plans an alert operation which causes the human to perform the expected avoidance operation. Examples of the alert operation include non-verbal communication, such as gesture, light, or sound, direct verbal communication, and the like. In this way, the alert operation is performed for the human from the autonomous mobile robot 1, whereby the intention (avoidance operation or expected avoidance operation) of the autonomous mobile robot 1 can be transmitted to the human. The human which understands the intention of the autonomous mobile robot 1 performs the expected avoidance operation, and the robot performs the planned avoidance operation, thereby realizing concessions.

Next, the configuration of the autonomous mobile robot 1 will be described.

As shown in FIG. 1, the autonomous mobile robot 1 includes a control device 2 which performs overall control of the robot. The control device 2 is constituted by, for example, hardware of a microcomputer, such as an ECU [Electric Control Unit], and software. The control device 2 is connected to a communication unit 3, a position detection unit 4, a map information storage unit 5, a radar sensor 6, and a camera 7.

The communication unit 3 performs wireless communication with an external terminal for robot control. The communication unit 3 receives a task (operation target) input to the external terminal through wireless communication. The communication unit 3 transmits the received task information to the control device 2.

The position detection unit 4 detects the present location of the autonomous mobile robot 1. The position detection unit 4 performs position detection using a GPS [Global Positioning System] or a wireless LAN [Local Area Network]. In the position detection, the present location may be obtained by comparing a peripheral obstacle acquired by an external sensor, such as a radar sensor or a camera, or relative position information of the autonomous mobile robot with respect to a landmark with map information. As in SLAM [Simultaneously Localization and Mapping], a method in which map creation and present location estimation by an external sensor are performed simultaneously may be used. The map information storage unit 5 stores a wide range of map information. The position detection unit 4 recognizes the present location on the basis of the map information of the map information storage unit 5. The position detection unit 4 transmits present location information of the autonomous mobile robot 1 and map information in the vicinity of the present location to the control device 2.

The radar sensor 6 detects an obstacle in the periphery of the robot by reflected waves of emitted electric waves. Examples of the obstacle include a structure, such as a building, a human, an animal, an automobile, other robots, and the like. A movable obstacle, such as a human, an animal, an automobile, or other robots, is referred to as a mobile obstacle. The radar sensor 6 transmits position information of the detected obstacle to the control device 2. The camera 7 images the periphery of the autonomous mobile robot 1. The camera 7 transmits image information of the periphery of the robot to the control device 2. The radar sensor 6 and the camera 7 function as a mobile obstacle detection means described in the appended claims. As the radar sensor of the invention, any radar sensor may be used insofar as the radar sensor can measure a distance from an obstacle using electric waves or similar means, such as light, electromagnetic waves, or sound waves.

The control device 2 includes a robot operation target generation unit 10, a human operation prediction unit 11, an operation planning unit 12, a movement control unit 13, and an alert control unit 14.

The robot operation target generation unit 10 generates an operation target of the autonomous mobile robot 1. The robot operation target generation unit 10 generates the operation target on the basis of the task information of the communication unit 3, the present location information of the position detection unit 4, and the map information. Specifically, when a destination is given as a task, the robot operation target generation unit 10 generates a control target value of an actuator (wheels or the like) for robot movement such that the robot arrives at the given destination efficiently. Examples of the target value include a route (position arrangement) or a course (position and time arrangement or speed arrangement), an acceleration pattern (acceleration arrangement), and the like. The operation target may be staying on a specific location or a task unaccompanied by movement (cleaning underneath a floor or the like).

The human operation prediction unit 11 predicts the operation of a human in the periphery of the autonomous mobile robot 1. The human operation prediction unit 11 first determines whether or not a human is detected in the periphery of the autonomous mobile robot 1 on the basis of the position information of the obstacle of the radar sensor 6 and the image information of the periphery of the robot from the camera 7. The detection of the position information of the human may be performed using one of the position information of the obstacle of the radar sensor 6 and the image information of the periphery of the robot of the camera. Of course, GPS data of the human may be acquired through communication. When it is determined that a human is detected, the human operation prediction unit 11 recognizes the traveling direction and the movement speed of the human from the history of the position information of the peripheral human. The human operation prediction unit 11 predicts a future operation when the human maintains the traveling direction and the movement speed. Examples of the future operation include an operation to reduce speed and stop, an operation to change the direction, and an operation to stay at this place, in addition to an operation to keep going in a predetermined direction. The human operation prediction unit 11 recognizes the appearance of an intended human or the circumstance in the periphery of the human (a positional relationship with an obstacle, a congested circumstance, or the like), thereby predicting an operation with higher accuracy.

The operation planning unit 12 plans the operation of the autonomous mobile robot 1. The operation planning unit 12 includes an operation interference determination unit 15, a concessional operation planning unit 16, and an alert operation planning unit 17.

The operation interference determination unit 15 determines whether or not the peripheral human interferes with the operation of the autonomous mobile robot 1 on the basis of the operation target generated by the robot operation target generation unit 10 and the operation of the peripheral human predicted by the human operation prediction unit 11. In the invention, operation interference in the operation interference determination unit 15 includes a state where the human and the autonomous mobile robot 1 approach each other such that the safety margin cannot be secured, as well as a state where the human and the autonomous mobile robot 1 come into contact with each other. The safety margin is set in advance in accordance with the appearance shape, purpose, or the like of the autonomous mobile robot 1. When it is determined that human and the autonomous mobile robot 1 approach each other within the safety margin, the operation interference determination unit 15 determines that the operations interfere with each other. The operation interference determination unit 15 functions as an approach determination means described in the appended claims. The safety margin of the autonomous mobile robot 1 corresponds to a predetermined interval described in the appended claims.

When the operation interference determination unit 15 determines that the peripheral human interferes with the operation of the autonomous mobile robot 1, the concessional operation planning unit 16 plans a concessional operation. The concessional operation is an operation having the avoidance operation of the autonomous mobile robot 1 and an expected avoidance operation which is expected of the human who interferes with the operation of the autonomous mobile robot 1. The avoidance operation is the operation of the autonomous mobile robot 1 for avoiding interference with the human. The expected avoidance operation is an avoidance operation which can be expected of the human so as to avoid an approach to or contact with the autonomous mobile robot 1 more than necessary. The concessional operation planning unit 16 may plan the expected avoidance operation using previous statistical data or the like.

The concessional operation planning unit 16 plans the avoidance operation capable of allowing most efficient avoidance while securing the safety margin on the basis of the planned expected avoidance operation and the operation target generated by the robot operation target generation unit 10. The concessional operation planning unit 16 may plan the avoidance operation of the autonomous mobile robot 1 and may then plan the expected avoidance operation of the human on the basis of the planned avoidance operation.

The concessional operation planning unit 16 corrects the avoidance operation and the expected avoidance operation on the basis of the deviation between the planned avoidance operation and the operation target generated by the robot operation target generation unit 10 and the deviation between the planned expected avoidance operation and the operation of the human predicted by the human operation prediction unit 11. For example, the concessional operation planning unit 16 performs corrections such that the two deviations become as small as possible. Accordingly, the concessional operation planning unit 16 can correct the plan such that the avoidance operation is prevented from being deviated from the operation target while preventing the expected avoidance operation from imposing on the human. The concessional operation planning unit 16 may correct the plan such that the sum of the two deviations is minimal. The concessional operation planning unit 16 functions as an operation planning means described in the appended claims.

The alert operation planning unit 17 plans an alert operation which causes the human to perform the expected avoidance operation on the basis of the expected avoidance operation planned by the concessional operation planning unit 16. The alert operation planning unit 17 plans the alert operation using communication, such as verbal, gesture, light, or sound. In the case of a verbal alert, the direction and degree of the avoidance operation can be transmitted verbally. In the case of an alert by gesture, for example, a movable portion, such as an arm portion of the robot, is used, the direction of avoidance of the human can be represented by the direction of movement of the movable portion or the direction of a tip portion of the movable portion, and the degree of avoidance can be represented by the movement speed of the movable portion or the size of the movement range. In the case of an alert by light, for example, a plurality of light sources are arranged in parallel to emit light in sequence, the direction of avoidance can be represented by the direction in which light flows and is visible, and the degree of avoidance can be represented by intensity of light. In the case of an alert by sound, for example, the degree of avoidance can be transmitted by volume of sound. These alert methods may be used in combination. Hereinafter, in the same case, description will not be repeated.

The movement control unit 13 controls a movement mechanism of the autonomous mobile robot 1. The movement control unit 13 controls a movement mechanism on the basis of the avoidance operation planned by the concessional operation planning unit 16 to execute the avoidance operation of the autonomous mobile robot 1. The movement control unit 13 controls the movement mechanism along the operation target generated by the robot operation target generation unit 10, whereby the operation target is attained.

The alert control unit 14 controls a voice output unit, a light output unit, or a joint driving portion of the autonomous mobile robot 1. The alert control unit 14 controls the voice output portion, the light output unit, or the joint driving portion on the basis of the alert operation planned by the alert operation planning unit 17 to execute the alert operation using voice, light, or gesture by the posture or movement of an upper body portion.

Next, a control procedure in the above-described control device 2 will be provided.

Figure 2:
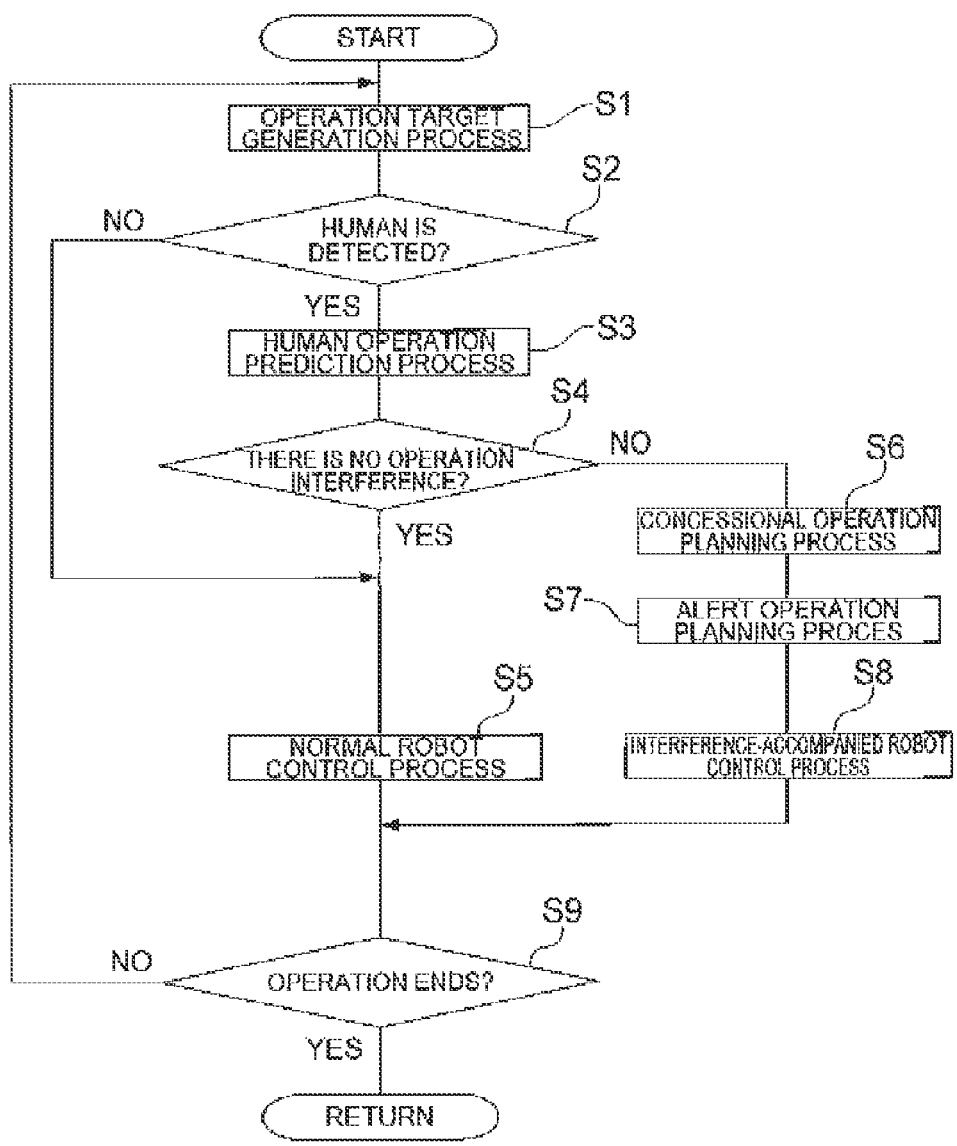
FIG. 2 is a flowchart showing a control procedure of a control device according to the first embodiment.

As shown in FIG. 2, in the control device 2, first, the robot operation target generation unit 10 performs an operation target generation process for generating the operation target of the autonomous mobile robot 1 (S1). The robot operation target generation unit 10 generates the operation target on the basis of the task information of the communication unit 3, the present location information of the position detection unit 4, and the map information.

Next, the human operation prediction unit 11 determines whether or not a human in the periphery of the autonomous mobile robot 1 is detected on the basis of the position information of the obstacle of the radar sensor 6 and the image information of the periphery of the robot of the camera 7 (S2). When it is determined that no human in the periphery of the autonomous mobile robot 1 is detected, the human operation prediction unit 11 progresses to Step S5. The operation of the invention is not limited to the human, and the invention can be applied to all mobile obstacles which autonomously move, such as robots and automobiles.

When it is determined that a human in the periphery of the autonomous mobile robot 1 is detected, the human operation prediction unit 11 performs an operation prediction process for predicting the operation of the detected peripheral human (S3). The human operation prediction unit 11 recognizes the traveling direction and the movement speed of the peripheral human on the basis of the positional information of the obstacle of the radar sensor 6 and the image information in the periphery of the robot of the camera 7. The human operation prediction unit 11 predicts a future operation of the human when maintaining the traveling direction and the movement speed.

The operation interference determination unit 15 determines whether the peripheral human and the operation of the autonomous mobile robot 1 interfere with each other on the basis of the operation target generated by the robot operation target generation unit 10 and the operation of the peripheral human predicted by the human operation prediction unit 11 (S4). When it is determined that there is no operation interference, the operation interference determination unit 15 progresses to Step S5.

In Step S5, the movement control unit 13 performs a normal robot control process for controlling the movement mechanism of the autonomous mobile robot 1 along the operation target generated by the robot operation target generation unit 10.

In Step S4, when the operation interference determination unit 15 determines that there is operation interference, the concessional operation planning unit 16 performs a concessional operation planning process for planning a concessional operation (S6). The concessional operation planning unit 16 plans, as the concessional operation, an avoidance operation of the autonomous mobile robot 1 and an expected avoidance operation which is expected of a human. Thereafter, the alert operation planning unit 17 performs an alert operation planning process for planning an alert operation to the human on the basis of the expected avoidance operation planned by the concessional operation planning unit 16 (S7).

In Step S8, the movement control unit 13 and the alert control unit 14 perform an interference-accompanied robot control process for realizing the concessional operation. In the interference-accompanied robot control process, the movement control unit 13 controls the movement mechanism on the basis of the avoidance operation of the autonomous mobile robot 1 planned by the concessional operation planning unit 16. The alert control unit 14 controls the autonomous mobile robot 1 so as to execute the alert operation planned by the alert operation planning unit 17.

Thereafter, the control device 2 determines whether or not the operation target is attained and the operation of the autonomous mobile robot 1 ends (S9). When it is determined that the operation of the autonomous mobile robot 1 does not end, the control device 2 repeats the process from Step S1. When it is determined that the operation of the autonomous mobile robot 1 ends, the control device 2 ends the control.

Subsequently, the functional effects of the above-described autonomous mobile robot 1 will be described.

According to the autonomous mobile robot 1 of the first embodiment, when the human approaches the autonomous mobile robot 1 within the safety margin, the human as well as the autonomous mobile robot 1 normally performs the avoidance operation. For this reason, the expected avoidance operation as the avoidance operation which is expected of the human is planned along with the avoidance operation of the autonomous mobile robot 1, whereby an efficient avoidance operation can be performed compared to a case where the autonomous mobile robot 1 performs avoidance in a unilateral manner, and a given task can be performed efficiently. As a result, movement efficiency is improved, whereby the autonomous mobile robot 1 can perform a task in a short time, and operation efficiency of the autonomous mobile robot 1 can be improved.

According to the autonomous mobile robot 1, the alert operation which causes the human to perform the expected avoidance operation is performed, thereby increasing the possibility that the human understands the intention of the mobile body and performs the expected avoidance operation. The autonomous mobile robot 1 performs the avoidance operation corresponding to the expected avoidance operation, whereby concessions which are made between humans can be realized between the human and the autonomous mobile robot 1. For this reason, according to the autonomous mobile robot 1, the operation target can be attained by concessions with the peripheral human even in a congested environment, and the coexistence of the human with the robot can be realized.

The intention of the autonomous mobile robot 1 is transmitted to an approaching human, whereby it is not necessary for the human to avoid the autonomous mobile robot 1 at a distance more than necessary, and the human and the autonomous mobile robot 1 can pass each other efficiently even in a congested environment. The intention of the autonomous mobile robot 1 is transmitted by the alert operation, whereby the human is prevented from making a concession in a wrong direction and coming into contact with the autonomous mobile robot 1, and the human can feel a sense of ease.

Second Embodiment

Figure 3:
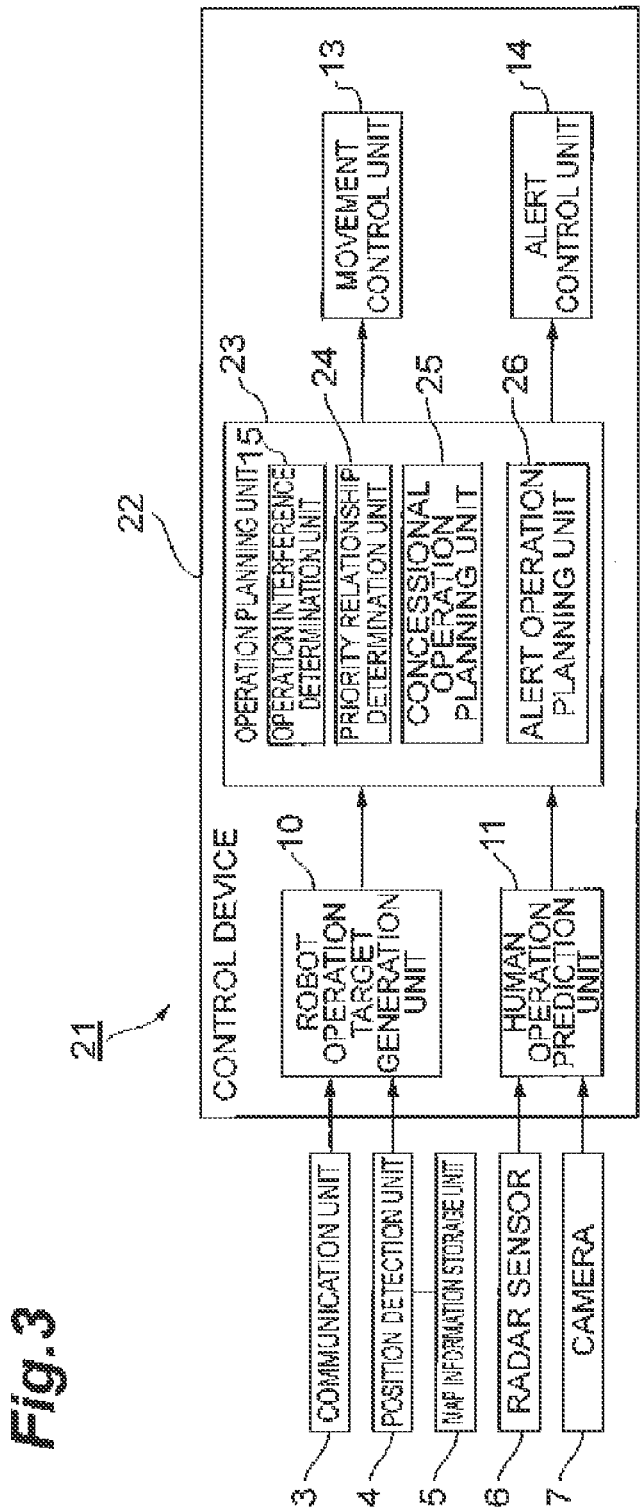
FIG. 3 is a block diagram showing the configuration of a second embodiment of a mobile body according to the invention.

As shown in FIG. 3, an autonomous mobile robot 21 of a second embodiment is different from the autonomous mobile robot 1 of the first embodiment in that a priority relationship determination unit 24 which determines the priority relationship between the human and the autonomous mobile robot 21 is provided, and the concessional operation and the alert operation are planned on the basis of the priority relationship determined by the priority relationship determination unit 24.

In the autonomous mobile robot 21 of the second embodiment, the priority relationship between the human and the autonomous mobile robot 21 which interfere with each other is determined. If how much a new movement target which is planned for the avoidance operation can maintain an original movement target is defined as movement efficiency in the concessional operation, the movement efficiencies of the human and the autonomous mobile robot 21 have a so-called trade-off relationship. As an index for solving the trade-off, the priority relationship is used. For example, the new movement targets of the human and the autonomous mobile robot 21 are determined such that the ratio of the movement efficiencies of the human and the autonomous mobile robot 21 coincides with the priority relationship. When the human has high priority, the original movement target of the human is maintained at a high percentage compared to the original movement target of the autonomous mobile robot 21.

In the autonomous mobile robot 21, the priority relationship determination unit 24 of the control device 22 determines the priority relationship between the human and the autonomous mobile robot 21. The priority relationship determination unit 24 compares the circumstance of the autonomous mobile robot 21 and the circumstance of the human to determine how much either the autonomous mobile robot 21 or the human should be given priority.

The priority relationship determination unit 24 recognizes a state where the human is in a hurry or a state where the human carries a large load or a heavy load on the basis of the position information of the obstacle of the radar sensor 6 and the image information of the camera 7. Each state can be recognized by a value obtained by measuring or estimating a physical quantity representing intensity of movement, such as the amount of movement, mass, or kinetic energy, using an appropriate sensor. The priority relationship determination unit 24 determines that the human who is in a hurry or carries a large load or a heavy load has high priority. The priority relationship determination unit 24 recognizes the type of the human, such as age or sex, and determines that a woman, a child, or an old person has high priority. The content of a task to be performed or the state of a human may be identified, and it may be determined that a person who is in a wheelchair, a guide in a crowd, or the like has high priority.

The priority relationship determination unit 24 determines the priority of the autonomous mobile robot 21 in accordance with the importance or urgency of the operation target. The priority relationship determination unit 24 determines the importance or urgency of the operation target from the content, time limit, or the like of the operation target. For example, when the content of the operation target relates to human safety, such as lifesaving or when the deadline of the operation target is impending, it is determined that the robot has high priority. The importance or urgency of the operation target may be set manually by the human when giving the operation target. When the importance or urgency of the operation target is high, the priority relationship determination unit 24 determines that the autonomous mobile robot 21 has high priority. Similarly to the determination on the priority of the human, the priority relationship determination unit 24 may determine that the priority is high when the movement speed of the autonomous mobile robot 21 is high or the transportation mass is large, that is, when a physical quantity representing intensity of movement is large.

The concessional operation planning unit 25 plans the avoidance operation of the autonomous mobile robot 21 and the expected avoidance operation of the human on the basis of the determination result of the priority relationship determination unit 24, the operation target generated by the robot operation target generation unit 10, and the operation of the human predicted by the human operation prediction unit 11. When the human has high priority, the concessional operation planning unit 25 maintains the original movement target as much as possible, and plans the expected avoidance operation close to the operation of the human predicted by the human operation prediction unit 11. That is, the expected avoidance operation is planned such that burden is not imposed on the human having high priority. When the autonomous mobile robot 21 has high priority, the concessional operation planning unit 25 plans the avoidance operation in which the original movement target for performing the operation target on a priority basis is maintained as much as possible. It is preferable that how much the avoidance operation maintains the movement target is quantified from an amount of change in the traveling direction or speed of the avoidance operation for the movement target, or an increase in the required movement time or traveling distance to a specific spot, or energy consumption.

The alert operation planning unit 26 plans the alert operation on the basis of the determination result of the priority relationship determination unit 24 and the expected avoidance operation planned by the concessional operation planning unit 25. When the human has high priority, the alert operation planning unit 26 plans an alert operation of weak assertion. When the autonomous mobile robot 21 has high priority, the alert operation planning unit 26 plans an alert operation of strong assertion. In the invention, the adjustment of intensity of assertion of the alert operation is realized by volume of sound in the case of an alert by sound, brightness of light in the case of an alert by light, and magnitude of force at the time of contact in the case of an alert by contact. Hereinafter, in the same case, description will not be repeated.

Next, a control procedure of the control device 22 of the second embodiment will be described.

Figure 4:
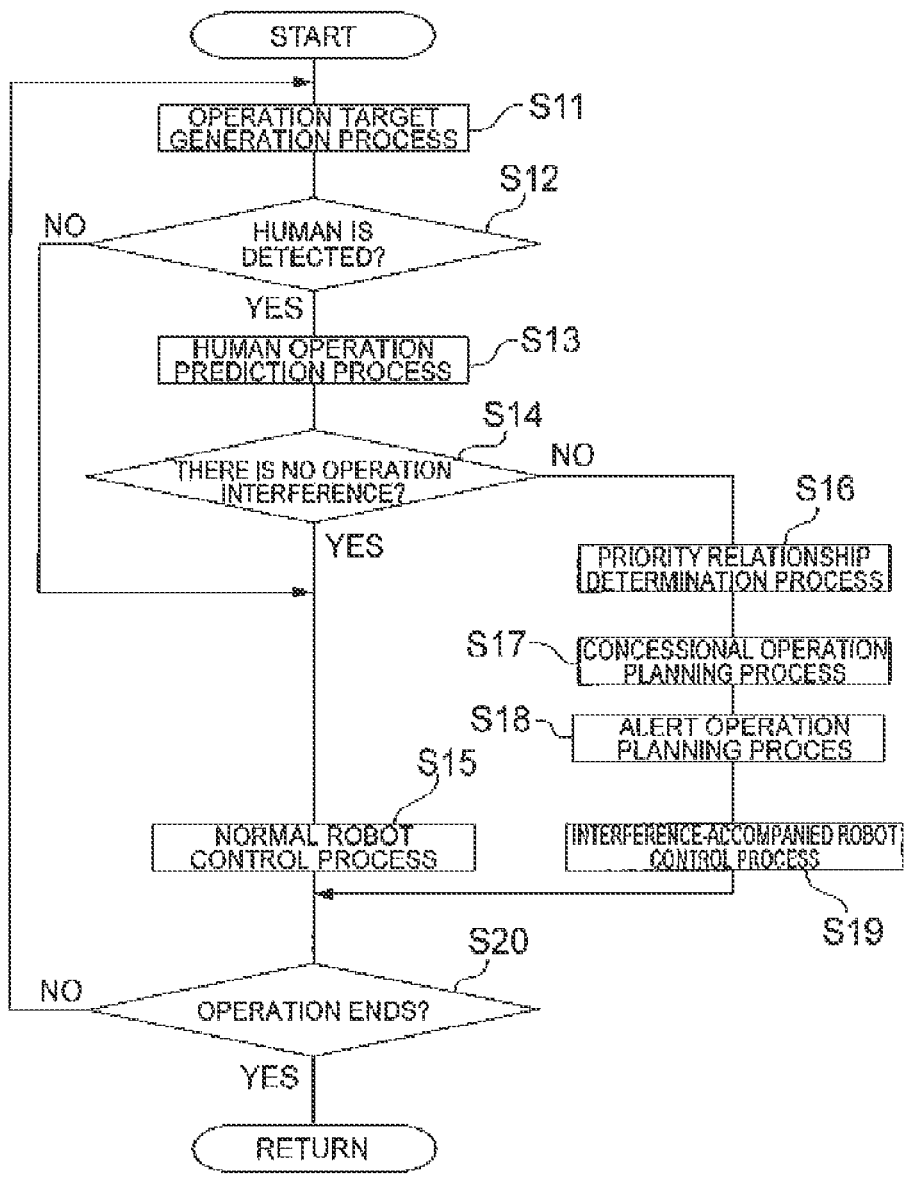
FIG. 4 is a flowchart showing a control procedure of a control device according to the second embodiment.

As shown in FIG. 4, in the control device 22, first, the robot operation target generation unit 10 performs an operation target generation process for generating the operation target (S11). Next, the human operation prediction unit 11 determines whether or not a human is detected in the periphery on the basis of the position information of the obstacle of the radar sensor 6 and the image information of the periphery of the robot of the camera 7 (S12). When it is determined that no human is detected, the human operation prediction unit 11 progresses to Step S15.

When it is determined that a human is detected, the human operation prediction unit 11 performs an operation prediction process for predicting the operation of the detected human (S13). Thereafter, the operation interference determination unit 15 determines whether or not the peripheral person interferes with the operation of the autonomous mobile robot 21 on the basis of the operation target generated by the robot operation target generation unit 10 and the operation of the human predicted by the human operation prediction unit 11 (S14). When it is determined that there is no operation interference, the operation interference determination unit 15 progresses to Step S15.

In Step S15, the movement control unit 13 performs a normal robot control process for controlling the movement mechanism of the autonomous mobile robot 21 along the operation target generated by the robot operation target generation unit 10.

In Step S14, when the operation interference determination unit determines that there is operation interference, the priority relationship determination unit 24 performs a priority relationship determination process for determining the priority relationship between the autonomous mobile robot 21 and the human (S16).

Thereafter, the concessional operation planning unit 25 performs a concessional operation planning process on the basis of the determination result of the priority relationship determination unit 24, the operation target generated by the robot operation target generation unit 10, and the operation of the human predicted by the human operation prediction unit 11 (S17). The concessional operation planning unit 25 plans, as the concessional operation, the avoidance operation of the autonomous mobile robot 21 and the expected avoidance operation which is expected of the human. Subsequently, the alert operation planning unit 26 performs an alert operation planning process for planning the alert operation to the human on the basis of the determination result of the priority relationship determination unit 24 and the expected avoidance operation planned by the concessional operation planning unit 25 (S18).

In Step S19, the movement control unit 13 and the alert control unit 14 perform an interference-accompanied robot control process for realizing the concessional operation. In the interference-accompanied robot control process, the movement control unit 13 controls the movement mechanism on the basis of the avoidance operation of the autonomous mobile robot 21 planned by the concessional operation planning unit 25. The alert control unit 14 controls the autonomous mobile robot 21 so as to execute the alert operation planned by the alert operation planning unit 26.

Thereafter, the control device 22 determines whether or not the operation target is attained and the operation of the autonomous mobile robot 21 ends (S20). When it is determined that the operation of the autonomous mobile robot 21 does not end, the control device 22 repeats the process from Step S11. When it is determined that the operation of the autonomous mobile robot 21 ends, the control device 22 ends the control.

According to the autonomous mobile robot 21 of the second embodiment, the operations are planned on the basis of the priority relationship between the autonomous mobile robot 21 and the human, whereby an appropriate operation plan according to circumstances can be made. Specifically, when a human who carries a large load or an old person is the other party, it is determined that the human has high priority, and an operation plan such that the autonomous mobile robot 21 largely performs avoidance can be made. When the autonomous mobile robot 21 is moving in an extreme urgency, such as medical treatment, it is determined that the autonomous mobile robot 21 has high priority, and an operation plan such that the human largely performs avoidance can be made.

According to the autonomous mobile robot 21, the alert operation can be planned on the basis of the priority relationship between the autonomous mobile robot 21 and the human, an alert operation of weak assertion is performed for an old person having high priority, whereby the operation of the human can be given priority. When the autonomous mobile robot 21 has high priority, an alert operation of strong assertion is performed, whereby the human can take the expected avoidance operation, and the operation of the autonomous mobile robot 21 can be given priority.

Third Embodiment

Figure 5:
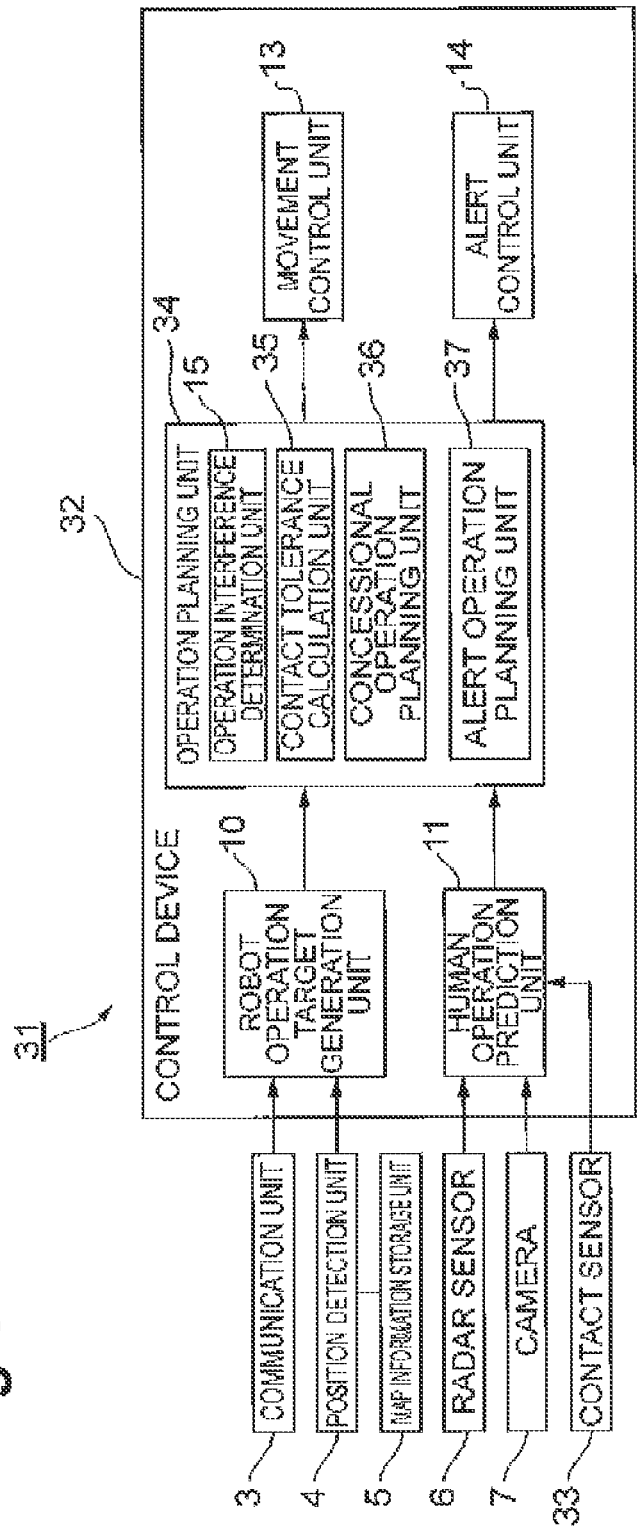
FIG. 5 is a block diagram showing the configuration of a third embodiment of a mobile body according to the invention.

As shown in FIG. 5, an autonomous mobile robot 31 of a third embodiment is different from the autonomous mobile robot 1 of the first embodiment in that contact of the human and the autonomous mobile robot 31 is permitted, a contact sensor 33 is provided, a contact tolerance calculation unit 35 which calculates contact tolerance of the human and the autonomous mobile robot 31 is provided, and the concessional operation and the alert operation are planned on the basis of the contact tolerance calculated by the contact tolerance calculation unit 35.

The autonomous mobile robot 31 of the third embodiment makes an operation plan while permitting contact of the human and the autonomous mobile robot 31. In this case, a plan is made while contact is permitted in advance and the safety margin is reduced, whereby effective congestion density is lowered to allow a margin for the route. However, it is necessary to secure human safety even if contact is made. The safety margin is set to 0 or a negative value, whereby a plan can be made such that the autonomous mobile robot 31 positively comes into contact with the human. As a result, the route has a large margin, whereby a plan can be easily made such that the autonomous mobile robot 31 can move efficiently.

In the autonomous mobile robot 31, contact is used in the alert operation as positive communication to the human. For example, contact with a human who has his/her back turned allows the human to be aware of the presence of the autonomous mobile robot 31. A way to apply force or a contact direction is adjusted, whereby the "direction" and "amount" of movement can be directly transmitted, and an easy-to-transmit alert can be performed simply compared to non-contact communication.

The contact sensor 33 of the third embodiment is, for example, a pressure sensor or a force sensor, or the like, and detects a contact state, such as the presence/absence of contact of the obstacle with the autonomous mobile robot 31, intensity of contact pressure, or a contact direction. The contact sensor 33 transmits the detected contact state information to the control device 32.

The contact tolerance calculation unit 35 calculates contact tolerance on the basis of the position information of the obstacle of the radar sensor 6, the image information of the camera 7, and the contact state information of the contact sensor 33. Specifically, the contact tolerance calculation unit 35 recognizes the direction of the face or body of the human through image processing, and calculates the contact tolerance in accordance with the direction of the face or body of the human. At this time, since a human who does not face the direction of the autonomous mobile robot 31 has difficulty in being aware of the present of the robot 31, the contact tolerance is calculated to be high so as to allow the human to be aware of the presence of the autonomous mobile robot 31 by contact. Alternatively, in order to avoid causing the human, who is unaware of the autonomous mobile robot 31, alarm or a sense of discomfort by abrupt contact, the contact tolerance may be calculated to be low for the human who does not face the direction of the autonomous mobile robot 31, thereby avoiding contact as much as possible. It is preferable that an appropriate calculation method of the contact tolerance is selected in accordance with circumstances taking into consideration the balance of the above-described two ways of thinking.

The concessional operation planning unit 36 plans the avoidance operation of the autonomous mobile robot 31 and the expected avoidance operation of the human on the basis of the contact tolerance calculated by the contact tolerance calculation unit 35, the operation target generated by the robot operation target generation unit 10, and the operation of the human predicted by the human operation prediction unit 11. The concessional operation planning unit 36 can reduce the safety margin which is set for the human in a route plan as the contact tolerance is high. This means that an effective physical size of a human can be reduced, and the route can have a margin, whereby a more efficient avoidance operation can be planned.

The alert operation planning unit 37 plans the alert operation on the basis of the contact tolerance calculated by the contact tolerance calculation unit 35 and the expected avoidance operation planned by the concessional operation planning unit 36. The alert operation planning unit 37 plans the alert operation by contact on the basis of the position information of the obstacle of the radar sensor 6, the image information of the camera 7, and the contact state information of the contact sensor 33 when it is determined that the alert operation by contact is valid. In the case of an alert by contact, the direction of avoidance of the human can be transmitted by the direction of force at the time of contact, and the degree of avoidance can be transmitted by the magnitude of force. Hereinafter, in the same case, description will not be repeated. The alert operation planning unit 37 plans the alert operation using direct communication by contact, whereby the intention of the autonomous mobile robot 31 can be transmitted to the human more reliably.

Next, a control procedure of the control device 32 of the third embodiment will be described.

Figure 6:
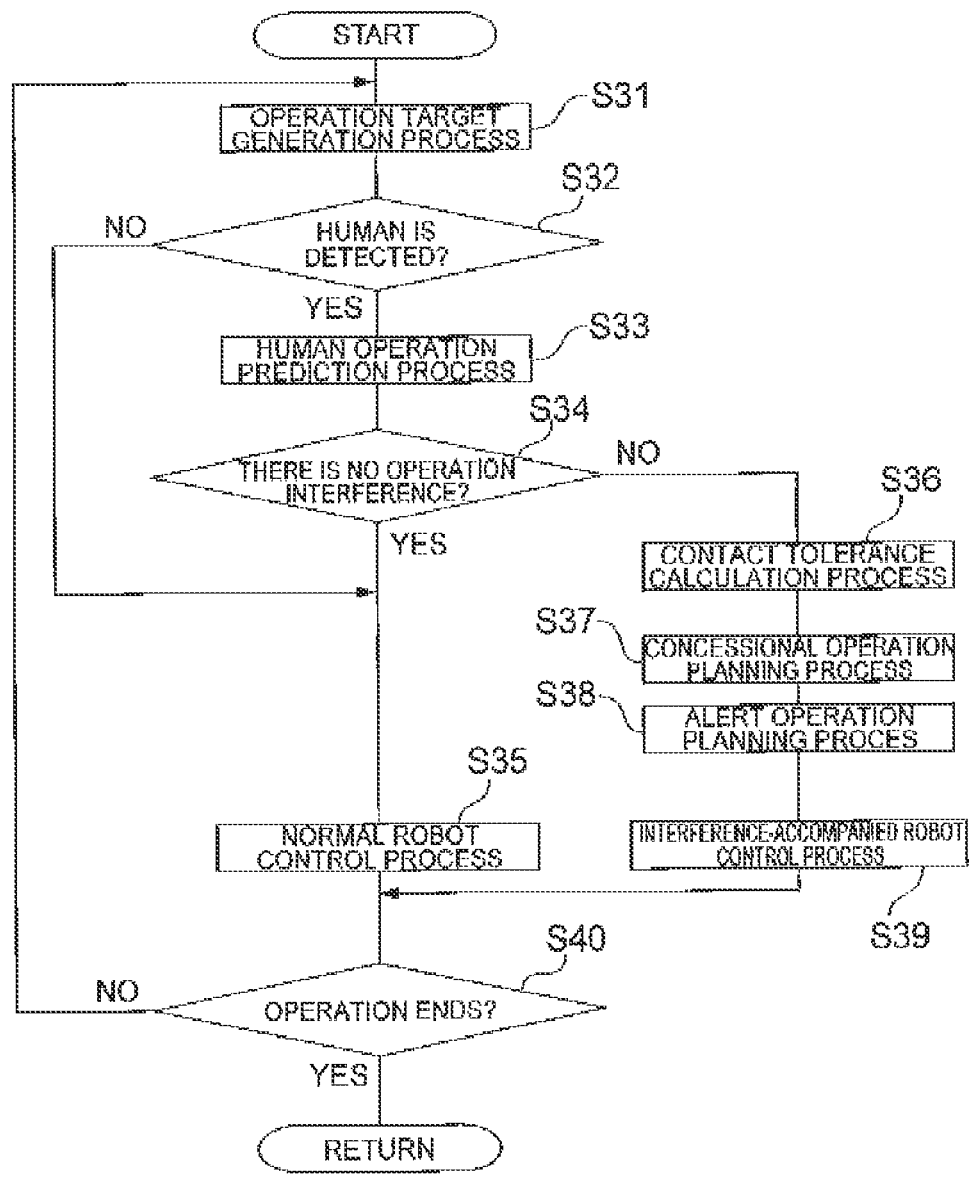
FIG. 6 is a flowchart showing a control procedure of a control device according to the third embodiment.

As shown in FIG. 6, in the control device 32, first, the robot operation target generation unit 10 performs an operation target generation process for generating the operation target (S31). Next, the human operation prediction unit 11 determines whether or not a human is detected in the periphery on the basis of the position information of the obstacle of the radar sensor 6, the image information of the periphery of the robot of the camera 7, and the contact state information of the contact sensor 33 (S32). When it is determined that no human is detected, the human operation prediction unit 11 progresses to Step S35.

When it is determined that a human is detected, the human operation prediction unit 11 performs an operation prediction process for predicting the operation of the detected human (S33). Thereafter, the operation interference determination unit 15 determines whether or not the peripheral person interferes with the operation of the autonomous mobile robot 31 on the basis of the operation target of the robot operation target generation unit 10 and the operation of the human predicted by the human operation prediction unit 11 (S34). When it is determined that there is no operation interference, the operation interference determination unit 15 progresses to Step S35.

In Step S35, the movement control unit 13 performs a normal robot control process for controlling the movement mechanism of the autonomous mobile robot 31 along the operation target generated by the robot operation target generation unit 10.

In Step S34, when the operation interference determination unit 15 determines that there is operation interference, the contact tolerance calculation unit 35 performs a contact tolerance calculation process for calculating the contact tolerance on the basis of the position information of the obstacle of the radar sensor 6, the image information of the camera 7, and the contact state information of the contact sensor 33 (S36).

Thereafter, the concessional operation planning unit 36 performs a concessional operation planning process on the basis of the contact tolerance calculated by the contact tolerance calculation unit 35, the operation target generated by the robot operation target generation unit 10, and the operation of the human predicted by the human operation prediction unit 11 (S37). The concessional operation planning unit 25 plans, as the concessional operation, the avoidance operation of the autonomous mobile robot 31 and the expected avoidance operation which is expected of the human who interferes with the operation of the autonomous mobile robot 31. Subsequently, the alert operation planning unit 37 performs an alert operation planning process for planning the alert operation to the human on the basis of the contact tolerance calculated by the contact tolerance calculation unit 35 and the expected avoidance operation planned by the concessional operation planning unit 36 (S38).

In Step S39, the movement control unit 13 and the alert control unit 14 perform an interference-accompanied robot control process for realizing the concessional operation. In the interference-accompanied robot control process, the movement control unit 13 controls a movement mechanism on the basis of the avoidance operation planned by the concessional operation planning unit 36 to execute the avoidance operation of the autonomous mobile robot 31. The alert control unit 14 controls the autonomous mobile robot 31 so as to execute the alert operation planned by the alert operation planning unit 37.

Thereafter, the control device 32 determines whether or not the operation target is attained and the operation of the autonomous mobile robot 31 ends (S40). When it is determined that the operation of the autonomous mobile robot 31 does not end, the control device 32 repeats the process from Step S31. When it is determined that the operation of the autonomous mobile robot 31 ends, the control device 32 ends the control.

According to the autonomous mobile robot 31 of the third embodiment, the avoidance operation and the expected avoidance operation are planned while permitting a certain degree of contact, whereby it is possible to allow a margin for the movable range of the autonomous mobile robot 31 compared to a case where no contact is permitted. For this reason, it is possible to allow a margin for the route even in a congested environment, and it becomes easy to make a plan such that the autonomous mobile robot 31 can move efficiently.

According to the autonomous mobile robot 31, it becomes possible to pass through the route particularly even when contact is inevitable. Since contact is used in the alert operation as positive communication to the human, an easy-to-transmit alert can be performed simply compared to non-contact communication, and the intention of the autonomous mobile robot 31 can be transmitted to the human more reliably.

Fourth Embodiment

Figure 7:
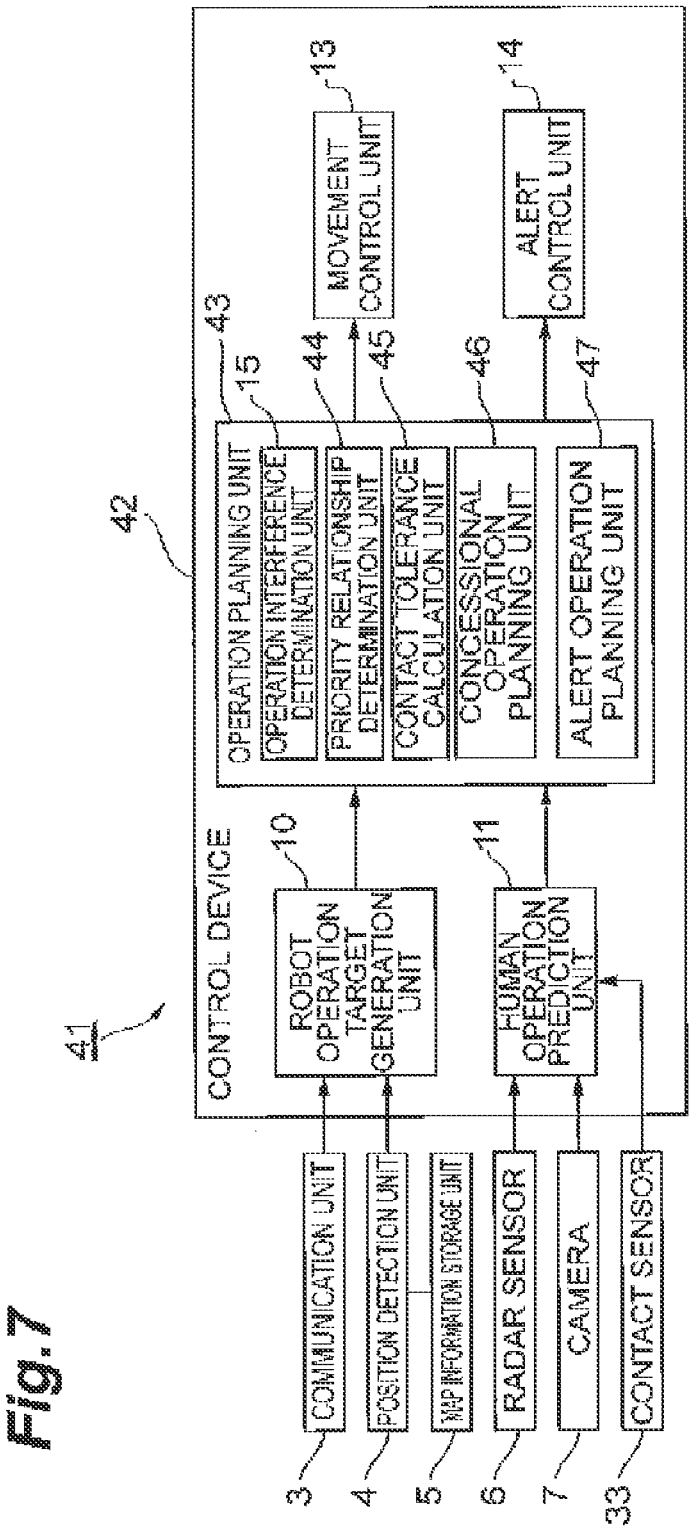
FIG. 7 is a block diagram showing the configuration of a fourth embodiment of a mobile body according to the invention.

As shown in FIG. 7, an autonomous mobile robot 41 of a fourth embodiment is different from the autonomous mobile robot 31 of the third embodiment in that a priority relationship determination unit 44 which determines the priority relationship between the human and the autonomous mobile robot 41 is provided, contact tolerance is calculated on the basis of the priority relationship determined by the priority relationship determination unit 44, and the concessional operation and the alert operation are planned on the basis of the priority relationship determined by the priority relationship determination unit 44.

In the autonomous mobile robot 41 of the fourth embodiment, the concessional operation and the alert operation are planned using the priority relationship between the human and the autonomous mobile robot 41 and the contact tolerance of the autonomous mobile robot 41 with respect to the human.

The priority relationship determination unit 44 of the control device 42 of the fourth embodiment determines the priority relationship between the human who interferes with the operation of the autonomous mobile robot 41 and the autonomous mobile robot 41 on the basis of the contact state information of the contact sensor 33, in addition to the position information of the obstacle of the radar sensor 6 and the image information of the camera 7. The priority relationship determination unit 44 uses the contact state information of the contact sensor 33, whereby the state where the human is difficult to perform avoidance due to a heavy load or the like can be recognized and the priority relationship can be appropriately determined.

The contact tolerance calculation unit 45 calculates the contact tolerance on the basis of the determination result of the priority relationship determination unit 44, in addition to the position information of the obstacle of the radar sensor 6, the image information of the camera 7, and the contact state information of the contact sensor 33. Specifically, the contact tolerance calculation unit 35 calculates the contact tolerance to be low because it is not preferable to make contact with a human who carries a large load and has high priority, or does not permit contact. The contact tolerance calculation unit 35 calculates the contact tolerance to be high when the autonomous mobile robot 41 has high priority, whereby it is possible to allow a margin for the route and to secure efficient movement. As the way of making contact, contact possibility or the degree of contact is considered. The adjustment of the way of making contact can be performed by changing the movement relationship between the human and the autonomous mobile robot 41.

The concessional operation planning unit 46 plans the avoidance operation of the autonomous mobile robot 41 and the expected avoidance operation of the human on the basis of the contact tolerance calculated by the contact tolerance calculation unit 45, the operation target generated by the robot operation target generation unit 10, the operation of the human predicted by the human operation prediction unit 11, and the determination result of the priority relationship determination unit 44. Similarly, the alert operation planning unit 47 plans the alert operation on the basis of the contact tolerance calculated by the contact tolerance calculation unit 45, the expected avoidance operation planned by the concessional operation planning unit 46, and the determination result of the priority relationship determination unit 44.

The alert operation planning unit 37 plans the alert operation by contact on the basis of the position information of the obstacle of the radar sensor 6, the image information of the camera 7, and the contact state information of the contact sensor 33 when the alert operation by contact is valid. In this case, the alert operation using direct communication by contact is planned, whereby the intention of the autonomous mobile robot 41 can be transmitted to the human more reliably.

Next, a control procedure of the control device 42 of the fourth embodiment will be described.

Figure 8:
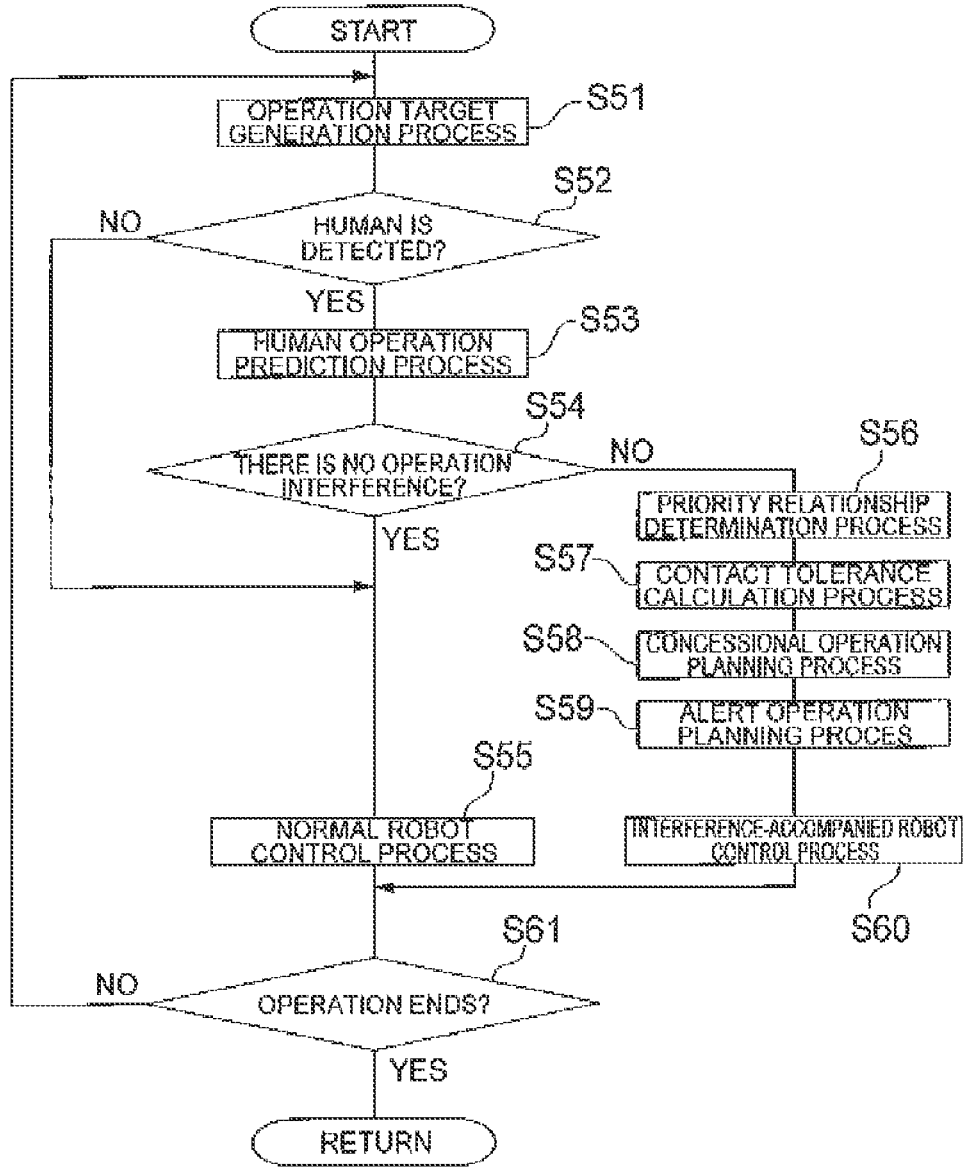
FIG. 8 is a flowchart showing a control procedure of a control device according to the fourth embodiment.

As shown in FIG. 8, in the control device 42, first, the robot operation target generation unit 10 performs an operation target generation process for generating the operation target (S51). Next, the human operation prediction unit 11 determines whether or not a human is detected in the periphery on the basis of the position information of the obstacle of the radar sensor 6, the image information of the periphery of the robot of the camera 7, and the contact state information of the contact sensor 33 (S52). When it is determined that no human is detected, the human operation prediction unit 11 progresses to Step S55.

When it is determined that a human is detected, the human operation prediction unit 11 performs an operation prediction process for predicting the operation of the detected human (S53). Thereafter, the operation interference determination unit 15 determines whether or not the peripheral person interferes with the operation of the autonomous mobile robot 41 on the basis of the operation target of the robot operation target generation unit 10 and the operation of the human predicted by the human operation prediction unit 11 (S54). When it is determined that there is no operation interference, the operation interference determination unit 15 progresses to Step S55.

In Step S55, the movement control unit 13 performs a normal robot control process for controlling the movement mechanism of the autonomous mobile robot 41 along the operation target generated by the robot operation target generation unit 10.

In Step S54, when the operation interference determination unit determines that there is operation interference, the priority relationship determination unit 44 performs a priority relationship determination process for determining the priority relationship between the autonomous mobile robot 41 and the human (S56). Thereafter, the contact tolerance calculation unit 45 performs a contact tolerance calculation process for calculating the contact tolerance on the basis of the position information of the obstacle of the radar sensor 6, the image information of the camera 7, and the contact state information of the contact sensor 33 (S57).

Subsequently, the concessional operation planning unit 46 performs a concessional operation planning process on the basis of the determination result of the priority relationship determination unit 44, the contact tolerance calculated by the contact tolerance calculation unit 45, the operation target generated by the robot operation target generation unit 10, and the operation of the human predicted by the human operation prediction unit 11 (S58). The concessional operation planning unit 46 plans, as the concessional operation, the avoidance operation of the autonomous mobile robot 41 and the expected avoidance operation which is expected of the human who interferes with the operation of the autonomous mobile robot 41. Subsequently, the alert operation planning unit 47 performs an alert operation planning process for planning the alert operation to the human on the basis of the contact tolerance calculated by the contact tolerance calculation unit 45 and the expected avoidance operation planned by the concessional operation planning unit 46 (S59).

In Step S60, the movement control unit 13 and the alert control unit 14 perform an interference-accompanied robot control process for realizing the concessional operation. In the interference-accompanied robot control process, the movement control unit 13 controls the movement mechanism on the basis of the avoidance operation of the autonomous mobile robot 41 planned by the concessional operation planning unit 46. The alert control unit 14 controls the autonomous mobile robot 41 so as to execute the alert operation planned by the alert operation planning unit 47.

Thereafter, the control device 42 determines whether or not the operation target is attained and the operation of the autonomous mobile robot 41 ends (S61). When it is determined that the operation of the autonomous mobile robot 41 does not end, the control device 42 repeats the process from Step S51. When it is determined that the operation of the autonomous mobile robot 41 ends, the control device 42 ends the control.

According to the autonomous mobile robot 41 of the fourth embodiment, the same effects as the autonomous mobile robots 21 and 31 of the second embodiment and the third embodiment can be obtained. The priority relationship determination unit 44 determines the priority relationship also taking into consideration the contact state information, whereby more reliable determination can be performed. The contact tolerance calculation unit 45 calculates the contact tolerance taking into consideration the priority relationship, whereby the contact tolerance according to circumstances can be calculated and an efficient operation plan can be made.

Fifth Embodiment

Figure 9:
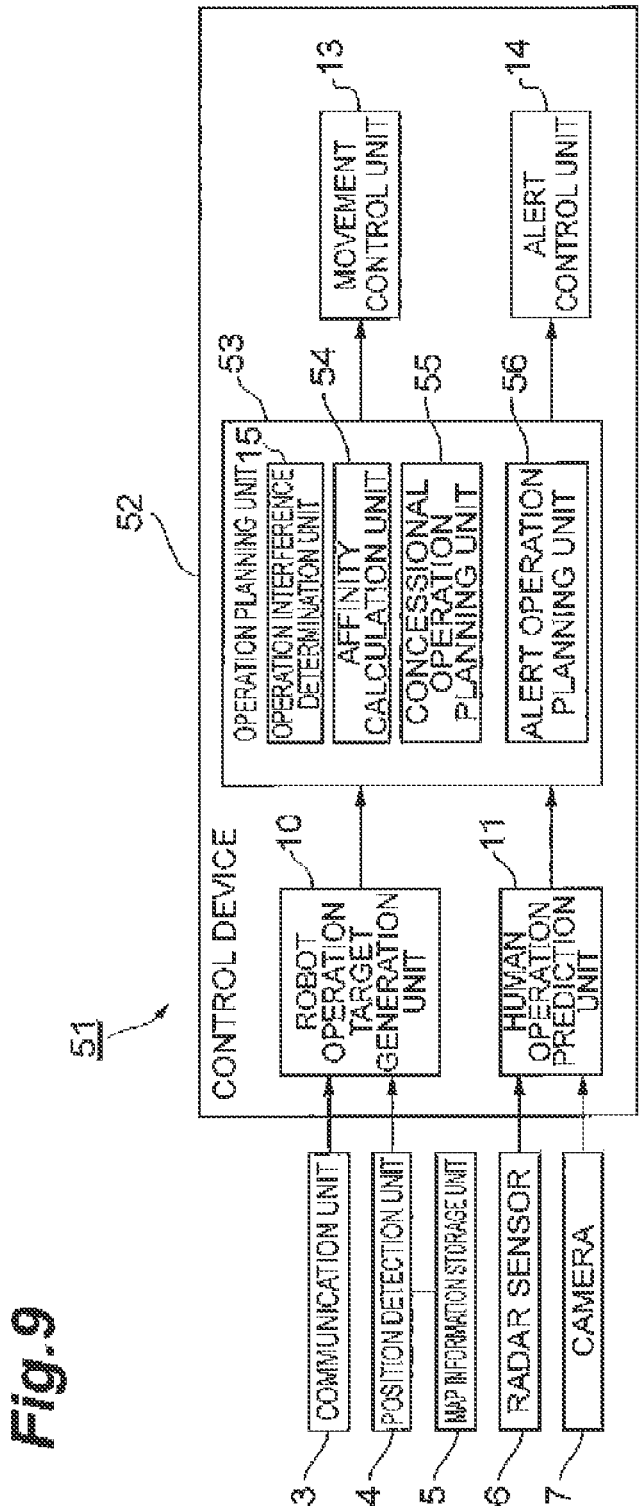
FIG. 9 is a block diagram showing the configuration of a fifth embodiment of a mobile body according to the invention.

As shown in FIG. 9, an autonomous mobile robot 51 of a fifth embodiment is different from the autonomous mobile robot 1 of the first embodiment in that contact of the human and the autonomous mobile robot 51 is permitted, an affinity calculation unit 54 which calculates affinity of the human for the autonomous mobile robot 51 is provided, and the concessional operation and the alert operation are planned on the basis of the affinity calculated by the affinity calculation unit 54.

In the autonomous mobile robot 51 of the fifth embodiment, affinity of the human for the autonomous mobile robot 51 is calculated. The affinity means friendliness of the robot for the human from physical, informational, emotional, environmental, and economical viewpoints, and means a human's sense of dread (fear) or ease on the robot. It is considered that the largest difference between concessions between human and concessions between the human and the robot is the affinity of the human for the robot. The affinity depends on the value of an individual or the implication of the robot, and becomes an evaluation criterion when generating a behavior for an alert. Children who have a great deal of curiosity about the robot and people who have wariness over machines change a behavior toward the robot or a way of thinking. In the case of children, children readily approach the robot, and this adversely affects the robot from the viewpoint of movement. Meanwhile, from the viewpoint of ease, unease is not given even if the distance is somewhat small, and there is a margin for route selection. In the case of people who have wariness, since these people have a behavior of stepping away from the robot, the route of the robot is easily secured, the human may feel uneasy even if the robot is distant from the human, and route selection is narrow. Accordingly, the movement relationship between the human and the robot is adjusted in accordance with the affinity to change the operation of the robot, whereby an operation plan can be made without giving the human a sense of unease or a sense of discomfort. The adjustment of the movement relationship according to the affinity can be realized, for example, by increasing the distance from the human when affinity is low or by reducing the movement speed of the robot when approaching the human, or the like.

The control device 52 of the autonomous mobile robot 51 calculates the affinity of the human for the autonomous mobile robot 51 in the affinity calculation unit 54. The affinity calculation unit 54 calculates the affinity on the basis of the image information of the camera 7.

Specifically, the affinity calculation unit 54 first recognizes the human size, weight, and type, such as age or sex, on the basis of the image information of the camera 7. The affinity calculation unit 54 stores parameters relating to the size, weight, or color of the autonomous mobile robot 51, and a risk of contact of the robot surface in advance. The affinity calculation unit 54 also stores statistical data relating to the affinity of the human for the autonomous mobile robot 51. It is preferable that statistical data relating to affinity includes data regarding the distance and the physiological state (heartbeat, blood pressure, or the like) when the human approaches the autonomous mobile robot 51. In this case, it is considered that as the heartbeat or blood pressure of the human is raised in a state where the distance is large, the affinity is low.

The affinity calculation unit 54 calculates the affinity on the basis of the comparison of the size of the human and the size of the autonomous mobile robot 51, the comparison of the weight of the human and the weight of the autonomous mobile robot 51, the type of the human, such as sex or age, the color of the autonomous mobile robot 51, the risk of contact of the surface, and statistical data. The affinity calculation unit 54 calculates the affinity to be low as the size of the autonomous mobile robot 51 is greater than the size of the human. As the parameters regarding the size, height, width, area, volume, or the like is considered. For example, the area of the human in the image of the camera 7 is regarded as the projection area when viewed from the autonomous mobile robot 51, and in this case, the size of the autonomous mobile robot 51 is calculated as the projection area when viewed from the human as the other party, whereby the comparison of the size can be appropriately performed.

The affinity calculation unit 54 calculates the affinity to be low as the weight of the autonomous mobile robot 51 is greater than the weight of the human. The affinity calculation unit 54 calculates the affinity to be low as the risk (edge sharpness or the like) of contact of the robot surface is high. The affinity calculation unit 54 calculates the affinity to be low when lightness of the color of the robot is low, when saturation is high, or when the hue is associated with a risk or attention (red, yellow, or the like). The affinity calculation unit 54 calculates the affinity to be low when the type of the human is an old person or a woman.

The concessional operation planning unit 55 plans the avoidance operation of the autonomous mobile robot 51 and the expected avoidance operation of the human on the basis of the affinity calculated by the affinity calculation unit 54, the operation target generated by the robot operation target generation unit 10, and the operation of the human predicted by the human operation prediction unit 11. When the affinity is high, even if the robot is rather close to the human or approaches the human at high speed, there is no concern that a sense of ease of the human is damaged. For this reason, the concessional operation planning unit 55 can make an efficient operation plan in which contact is permitted. When the affinity is low, the concessional operation planning unit 55 makes an operation plan, in which the speed is reduced when the robot is away from the human as far as possible or approaching the human, without giving the human a sense of unease or a sense of discomfort.

The alert operation planning unit 56 plans the alert operation on the basis of the affinity calculated by the affinity calculation unit 54 and the expected avoidance operation planned by the concessional operation planning unit 55. When the affinity is high, the alert operation planning unit 56 plans an alert operation of strong assertion including contact. When the affinity is low, since an alert by contact may damage a sense of ease of the human, the alert operation planning unit 56 plans an alert operation of weak assertion by non-contact communication, such as sound or light. For example, it is preferable that, when the affinity is high, a biological alert, such as voice, contact, or gesture, that is, an alert close to the human is selected, and when the affinity is low, siren, a mechanical alert, such as warning tone, or warning light, is selected. In this case, a comfortable alert can be performed for the human. With a comfortable alert, an alert can be performed more effectively without giving the human a sense of unease. Hereinafter, in the same case, description will not be repeated.

Next, a control procedure of the control device 52 of the fifth embodiment will be described.

Figure 10:
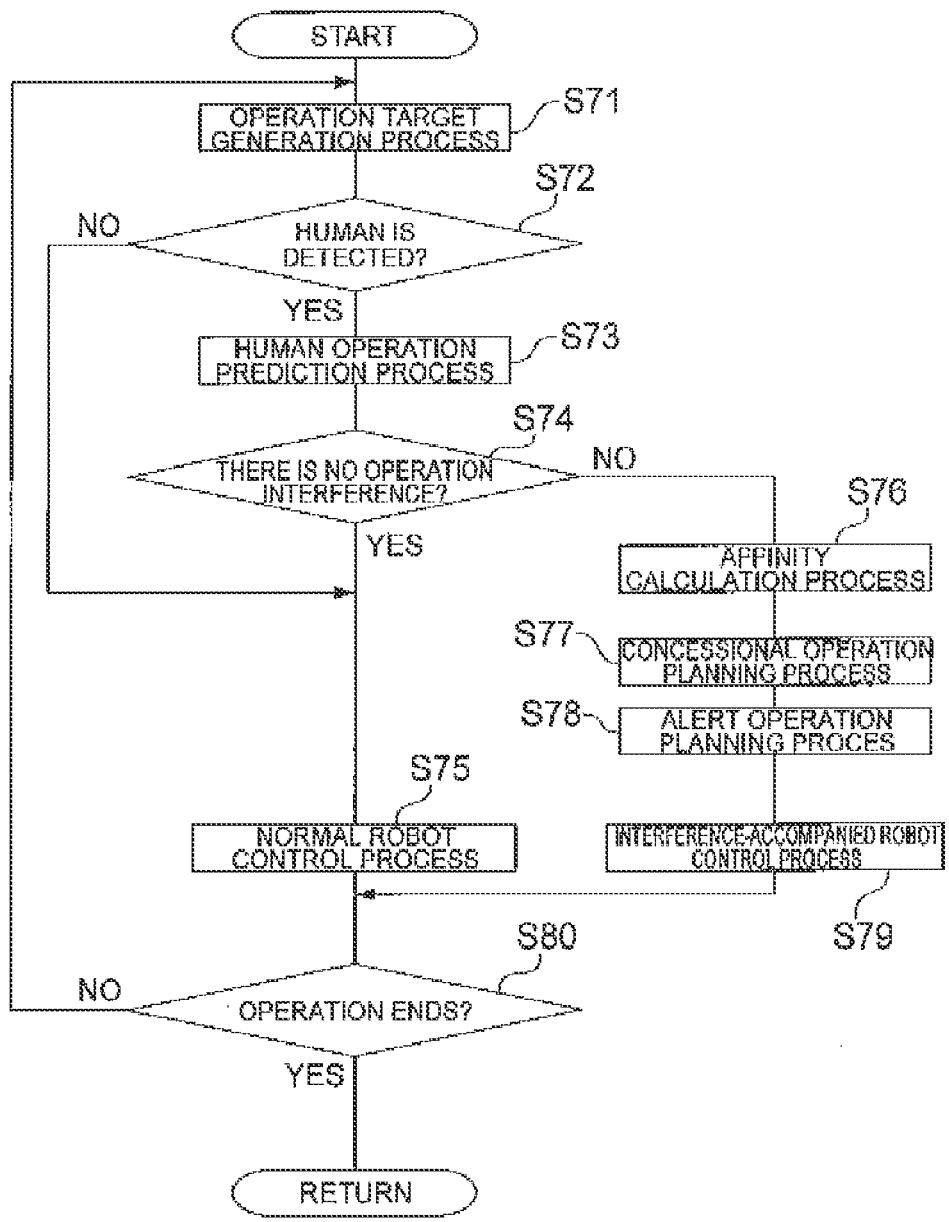
FIG. 10 is a flowchart showing a control procedure of a control device according to the fifth embodiment.

As shown in FIG. 10, in the control device 52, first, the robot operation target generation unit 10 performs an operation target generation process for generating the operation target (S71). Next, the human operation prediction unit 11 determines whether or not a human is detected in the periphery on the basis of the position information of the obstacle of the radar sensor 6 and the image information of the camera 7 (S72). When it is determined that no human is detected, the human operation prediction unit 11 progresses to Step S75.

When it is determined that a human is detected, the human operation prediction unit 11 performs an operation prediction process for predicting the operation of the detected human (S73). Thereafter, the operation interference determination unit 15 determines whether or not the peripheral person interferes with the operation of the autonomous mobile robot 51 on the basis of the operation target of the robot operation target generation unit 10 and the operation of the human predicted by the human operation prediction unit 11 (S74). When it is determined that there is no operation interference, the operation interference determination unit 15 progresses to Step S75.

In Step S75, the movement control unit 13 performs a normal robot control process for controlling the movement mechanism of the autonomous mobile robot 51 along the operation target generated by the robot operation target generation unit 10.

In Step S74, when the operation interference determination unit determines that there is operation interference, the affinity calculation unit 54 performs an affinity calculation process for calculating the affinity of the human for the autonomous mobile robot 51 on the basis of the image information of the camera 7 (S76).

Thereafter, the concessional operation planning unit 55 performs a concessional operation planning process on the basis of the affinity calculated by the affinity calculation unit 54, the operation target generated by the robot operation target generation unit 10, and the operation of the human predicted by the human operation prediction unit 11 (S77). The concessional operation planning unit 55 plans, as the concessional operation, the avoidance operation of the autonomous mobile robot 51 and the expected avoidance operation which is expected of the human. Subsequently, the alert operation planning unit 56 performs an alert operation planning process for planning the alert operation to the human on the basis of the affinity calculated by the affinity calculation unit 54 and the expected avoidance operation planned by the concessional operation planning unit 55 (S78).

In Step S79, the movement control unit 13 and the alert control unit 14 perform an interference-accompanied robot control process for realizing the concessional operation. In the interference-accompanied robot control process, the movement control unit 13 controls the movement mechanism on the basis of the avoidance operation of the autonomous mobile robot 51 planned by the concessional operation planning unit 55. The alert control unit 14 controls the autonomous mobile robot 51 so as to execute the alert operation planned by the alert operation planning unit 56.

Thereafter, the control device 52 determines whether or not the operation target is attained and the operation of the autonomous mobile robot 51 ends (S80). When it is determined that the operation of the autonomous mobile robot 51 does not end, the control device 52 repeats the process from Step S71. When it is determined that the operation of the autonomous mobile robot 51 ends, the control device 52 ends the control.

According to the autonomous mobile robot 51 of the fifth embodiment, the operations are planned on the basis of the affinity of the human for the autonomous mobile robot 51, whereby the concessional operation or the alert operation can be performed without giving the human a sense of unease or a sense of discomfort. The alert operation is planned on the basis of the affinity of the human for the autonomous mobile robot 51, whereby it is possible to prevent the human from feeling a sense of unease or a sense of discomfort.

Sixth Embodiment

Figure 11:
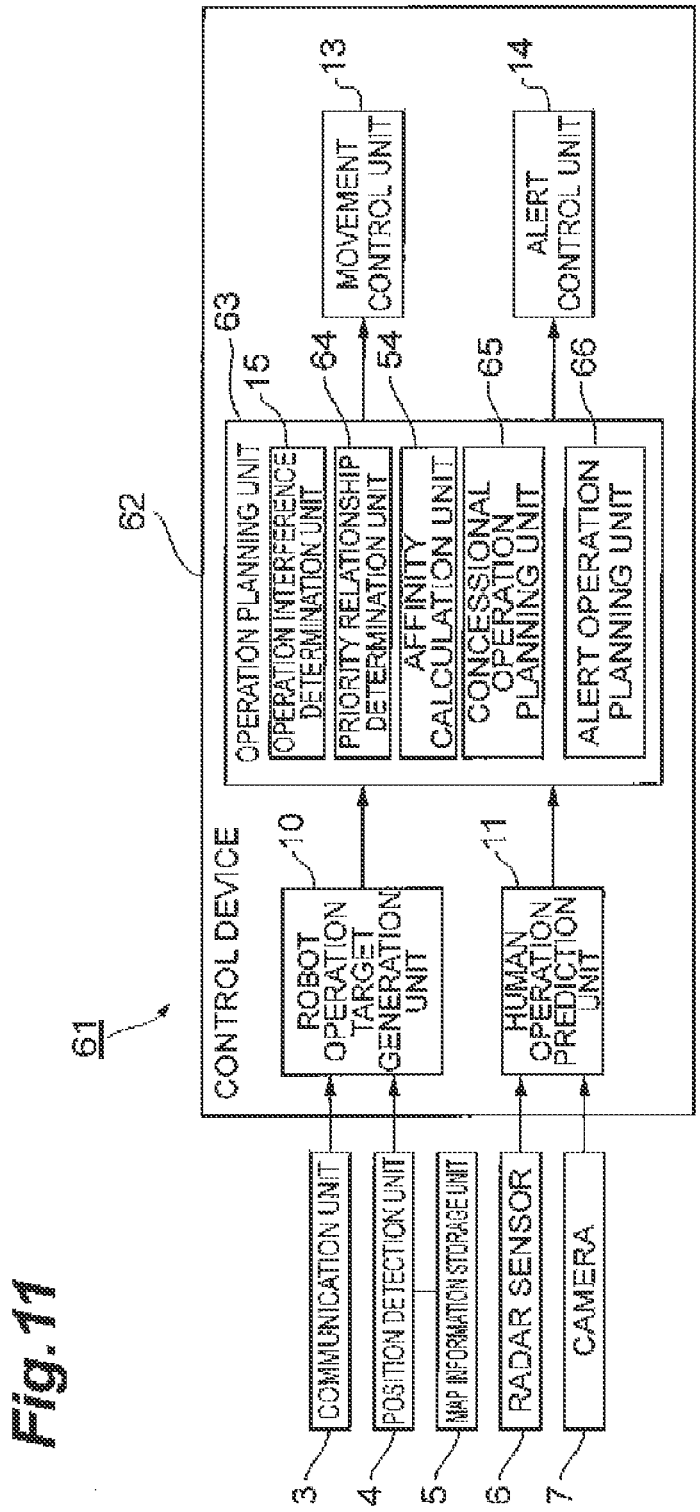
FIG. 11 is a block diagram showing the configuration of a sixth embodiment of a mobile body according to the invention.

As shown in FIG. 11, an autonomous mobile robot 61 of a sixth embodiment is different from the autonomous mobile robot 51 of the fifth embodiment in that a priority relationship determination unit 64 which determines the priority relationship between the human and the autonomous mobile robot 61 is provided, and the concessional operation and the alert operation are planned on the basis of the priority relationship determined by the priority relationship determination unit 64.

In the autonomous mobile robot 61 of the sixth embodiment, the concessional operation and the alert operation are planned using the priority relationship between the human and the autonomous mobile robot 61 and affinity of the human for the autonomous mobile robot 61.

The priority relationship determination unit 64 of the control device 62 of the sixth embodiment determines the priority relationship between the human who interferes with the operation of the autonomous mobile robot 61 and the autonomous mobile robot 61, the position information of the obstacle of the radar sensor 6, and the image information of the camera 7.

The concessional operation planning unit 65 plans the avoidance operation of the autonomous mobile robot 61 and the expected avoidance operation of the human on the basis of the affinity calculated by the affinity calculation unit 54, the operation target generated by the robot operation target generation unit 10, the operation of the human predicted by the human operation prediction unit 11, and the determination result of the priority relationship determination unit 64. Similarly, the alert operation planning unit 66 plans the alert operation on the basis of the affinity calculated by the affinity calculation unit 54, the expected avoidance operation planned by the concessional operation planning unit 65, and the determination result of the priority relationship determination unit 64.

Next, a control procedure of the control device 62 of the sixth embodiment will be described.

Figure 12:
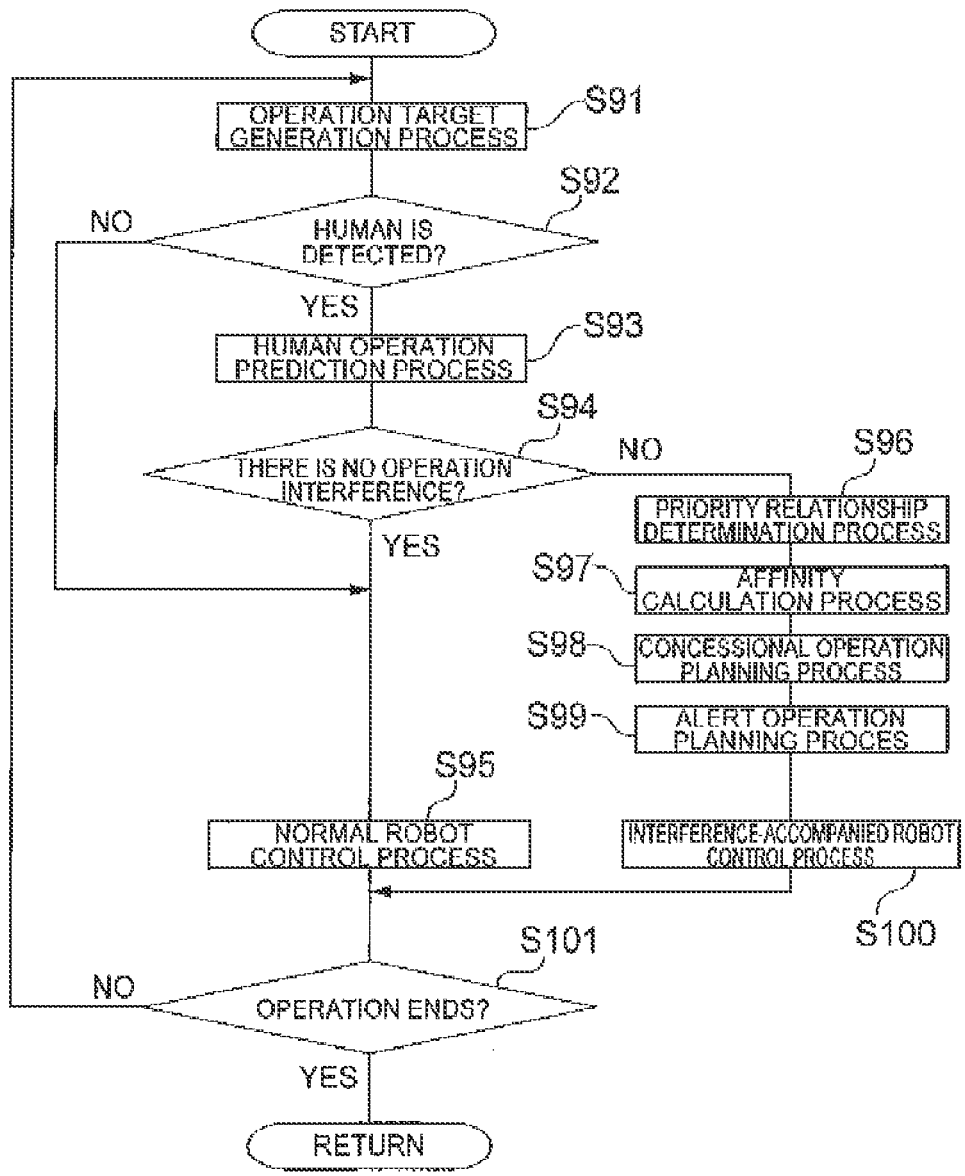
FIG. 12 is a flowchart showing a control procedure of a control device according to the sixth embodiment.

As shown in FIG. 12, in the control device 62, first, the robot operation target generation unit 10 performs an operation target generation process for generating the operation target (S91). Next, the human operation prediction unit 11 determines whether or not a human is detected in the periphery on the basis of the position information of the obstacle of the radar sensor 6 and the image information of the camera 7 (S92). When it is determined that no human is detected, the human operation prediction unit 11 progresses to Step S95.

When it is determined that a human is detected, the human operation prediction unit 11 performs an operation prediction process for predicting the operation of the detected human (S93). Thereafter, the operation interference determination unit 15 determines whether or not the peripheral person interferes with the operation of the autonomous mobile robot 61 on the basis of the operation target of the robot operation target generation unit 10 and the operation of the human predicted by the human operation prediction unit 11 (S94). When it is determined that there is no operation interference, the operation interference determination unit 15 progresses to Step S95.

In Step S95, the movement control unit 13 performs a normal robot control process for controlling the movement mechanism of the autonomous mobile robot 61 along the operation target generated by the robot operation target generation unit 10.

In Step S94, when the operation interference determination unit 15 determines that there is operation interference, the priority relationship determination unit 64 performs a priority relationship determination process for determining the priority relationship between the autonomous mobile robot 61 and the human (S96). Thereafter, the affinity calculation unit 54 performs an affinity calculation process for calculating the affinity on the basis of the image information of the camera 7 (S97).

Subsequently, the concessional operation planning unit 65 performs a concessional operation planning process on the basis of the determination result of the priority relationship determination unit 64, the affinity calculated by the affinity calculation unit 54, the operation target generated by the robot operation target generation unit 10, and the operation of the human predicted by the human operation prediction unit 11 (S98). The concessional operation planning unit 65 plans, as the concessional operation, the avoidance operation of the autonomous mobile robot 61 and the expected avoidance operation which is expected of the human who interferes with the operation of the autonomous mobile robot 61. Thereafter, the alert operation planning unit 66 performs an alert operation planning process for planning the alert operation to the human on the basis of the determination result of the priority relationship determination unit 64, the affinity calculated by the affinity calculation unit 54, and the expected avoidance operation planned by the concessional operation planning unit 65 (S99).

In Step S100, the movement control unit 13 and the alert control unit 14 perform an interference-accompanied robot control process for realizing the concessional operation. In the interference-accompanied robot control process, the movement control unit 13 controls the movement mechanism on the basis of the avoidance operation of the autonomous mobile robot 61 planned by the concessional operation planning unit 65. The alert control unit 14 controls the autonomous mobile robot 61 so as to execute the alert operation planned by the alert operation planning unit 66.

Thereafter, the control device 62 determines whether or not the operation target is attained and the operation of the autonomous mobile robot 61 ends (S101). When it is determined that the operation of the autonomous mobile robot 61 does not end, the control device 62 repeats the process from Step S91. When it is determined that the operation of the autonomous mobile robot 61 ends, the control device 62 ends the control.

According to the autonomous mobile robot 61 of the sixth embodiment, the same effects as the autonomous mobile robots of the second embodiment and the fifth embodiment can be obtained. The concessional operation and the alert operation are planned on the basis of the priority relationship between the human and the autonomous mobile robot 61 and the affinity of the human for the autonomous mobile robot 61, whereby an appropriate operation plan according to circumstances can be made without giving the human a sense of unease or a sense of discomfort.

Seventh Embodiment

In a seventh embodiment, description will be provided using a manipulator robot 71 as the mobile body of the invention. The manipulator robot 71 performs a cooperative task along with the operator, and is, for example, a robot which supports the task of the operator in a cell production system. The manipulator robot 71 moves the hand to perform a task support, such as holding or movement of a work piece or transportation of components or tools, and performs a task support in conformity with the movement of the operator, thereby realizing reduction in burden on the operator or improvement in task efficiency. The manipulator robot 71 may be a mobile manipulator which is movable on the ground or a fixed manipulator whose base is fixed to the ground.

In the task support, there is a problem in that, even if a support operation of the robot conforms to the movement of the operator, a support which should be performed by the robot may not be appropriately performed depending on a task method (a task procedure, a task speed, a way of holding a task object, or the like) of the operator. In particular, when the operator is replaced or when the same task is performed in parallel in a plurality of cells, there is a limit to customize a device or control program for each operator. Accordingly, after the robot takes into consideration a method which is desired by the operator, a new task method is planned and an alert is performed so as to lead the operator. The alert allows the operator to understand a way of movement which is expected by the robot, thereby conforming to a task method which is expected by the robot. As a result, a cooperative task is performed in a form in which both the human and the robot conform to each other. As the support of the robot is valid, task quality and efficiency are improved in the circumstance in which the human cooperates with the robot to some extent and an appropriate task support is obtained more than in the circumstance in which the human moves freely and the robot cannot support. As a result, product quality or productivity can be improved.

In a cell production system which is suitable for manufacturing a wide variety of products in small quantities, there is an advantage of easily changing production items and specifications. Meanwhile, when the changes are made frequently or in a task immediately after the change, the mistake in the type of component to be assembled or a task procedure missing is likely to occur. In regard to this problem, the robot is given high priority and the robot positively leads the operator to a correct assembling component or task procedure, whereby the occurrence of failure or a task missing can be reduced. Accordingly, in the manipulator robot 71, as well as the task support, when the operator performs an operation different from a plan, the alert operation is performed such that the operator follows a correct task method, thereby improving task quality and efficiency.

Figure 13:
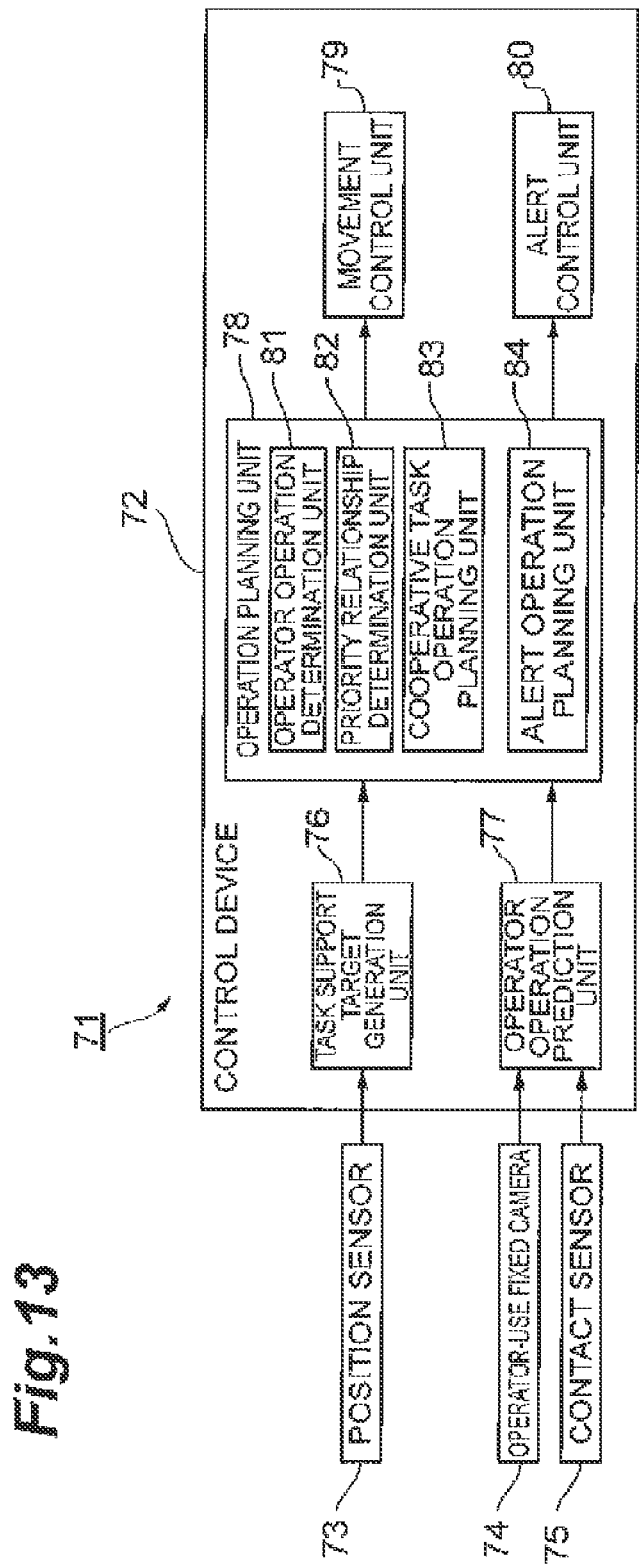
FIG. 13 is a block diagram showing the configuration of a seventh embodiment of a mobile body according to the invention.

As shown in FIG. 13, the manipulator robot 71 includes a control device 72 which performs overall control. The control device 72 is connected to a position sensor 73, an operator-use fixed camera 74, and a contact sensor 75.

The position sensor 73 detects the posture (the position of each joint and hand) of the manipulator robot 71. The position sensor 73 transmits the detected posture information to the control device 72. The operator-use fixed camera 74 is a camera which images the state of an operator or a task object to be supported by the manipulator robot 71. The operator-use fixed camera 74 transmits image information of the operator or the task object to the control device 72. The contact sensor 75 detects a contact state with the manipulator robot 71. The contact sensor 75 transmits the detected contact state information to the control device 72.

The control device 72 has a task support target generation unit 76, an operator operation prediction unit 77, an operation planning unit 78, a movement control unit 79, and an alert control unit 80.

The task support target generation unit 76 generates a task support target of the manipulator robot 71. The task support target generation unit 76 generates the task support target, such as a movement target, on the basis of the posture information of the position sensor 73.

The operator operation prediction unit 77 detects and predicts the operation of the operator on the basis of the image information of the operator-use fixed camera 74 and the contact state information of the contact sensor 75.

The operation planning unit 78 has an operator operation determination unit 81, a priority relationship determination unit 82, a cooperative task operation planning unit 83, and an alert operation planning unit 84.

The operator operation determination unit 81 determines whether or not the operation of the operator has an appropriate task content by comparing the operation predicted by the operator operation prediction unit 77 with a database in which a standard task is stored. When the operation of the operator is an operation which does not have an appropriate task content, for example, this refers to a task procedure which violates a determined standard specification, an operation which mistakes a tool to be used or a component to be assembled, or the like. When it is determined that the operation of the operator does not have an appropriate task content, the operator operation determination unit 81 determines whether or not the operation of the operator can provide an appropriate support to the operation of the operator on the basis of the task support target generated by the task support target generation unit 76 and the operation predicted by the operator operation prediction unit 77. When an appropriate support cannot be provided, for example, this refers to a case where the position or posture of the operator or the task object is away from the manipulator robot 71 or is in a direction in which the manipulator robot 71 has structural difficulty in providing a support, an operation in which the operation speed of the operator is excessively high or low, a case where the position of the grip of the operator for the task object is inappropriate, or the like.

When the operator operation determination unit 81 determines that the operation of the operator does not have an appropriate task content, the priority relationship determination unit 82 determines that the priority relationship between the operator and the manipulator robot 71 places priority on the manipulator robot 71. When the operator operation determination unit 81 determines that the operation of the operator has an appropriate task content and an appropriate support can be provided for the operation of the operator, the priority relationship determination unit 82 determines the priority relationship on the basis of the task support target generated by the task support target generation unit 76 and the operation predicted by the operator operation prediction unit 77. In this case, it is preferable to determine the priority in accordance with the degree of contribution of a task support content. For example, in the case of a support content which can significantly reduce the task load of the operator or a support content which can significantly improve task accuracy, it is determined that the manipulator robot 71 has high priority. Alternatively, it is preferable to determine the priority in accordance with the degree of proficiency of the operator. When the degree of proficiency of the operator is low, it is determined that the manipulator robot 71 is given priority, whereby the manipulator robot 71 can positively perform a task support which leads the human and a cell production can be applied while suppressing the occurrence of degradation in quality or variation without causing significant degradation in production efficiency even for an unskilled operator. When the degree of proficiency of the operator is high, it is determined that the operator is given priority, whereby most of task methods conform to a method which is desired by the operator. When the operator does not want the task support of the manipulator robot 71, no support is performed forcedly, and only when the operator wants the task support of the manipulator robot 71, the task support can be provided.

When the operator operation determination unit 81 determines that the operation of the operator does not have an appropriate task content, the cooperative task operation planning unit 83 plans an operation following a standard task as an expected operation which is expected of the operator. When it is determined that an appropriate support cannot be provided for the operation of the operator, the cooperative task operation planning unit 83 plans a cooperative task operation on the basis of the determination result of the priority relationship determination unit 82, the task support target generated by the task support target generation unit 76, and the operation predicted by the operator operation prediction unit 77. The support operation includes an avoidance operation when the operator and the manipulator robot 71 collide with each other, and the expected operation includes an expected avoidance operation which is expected of the operator. In the cooperative task operation planning unit 83, an operation plan is made such that contact of the operator and the manipulator 71 is permitted. The contact tolerance in the seventh embodiment may have a fixed value or may be changed depending on the task content or task state of the operator. That is, for example, while the operator performs an accurate task, such as assembling of small components, which requires high accuracy or a task which handles a dangerous object, such as a blade, the contact tolerance is lowered, whereby it is possible to prevent contact from interfering with the task of the operator and endangering the operator.

The alert operation planning unit 84 plans an alert operation which leads the operator to perform an operation which follows a standard task or an operation which can be supported by the task support of the manipulator robot 71 on the basis of the determination result of the priority relationship determination unit 82 and the expected operation planned by the cooperative task operation planning unit 83. In this case, as the alert operation, for example, a method in which a force is applied to the operator by contact to lead direct movement, a method in which an excessively high or low operation speed is transmitted by a sound generation rhythm or a light blink rate, or the like is used.

The movement control unit 79 controls the posture of the manipulator robot 71 on the basis of the support operation planned by the cooperative task operation planning unit 83. The alert control unit 80 executes the alert operation to the operator using communication, such as voice output, light output, or contact, on the basis of the alert operation planned by the alert operation planning unit 84.

Next, a control procedure of the control device 72 of the seventh embodiment will be described.

Figure 14:
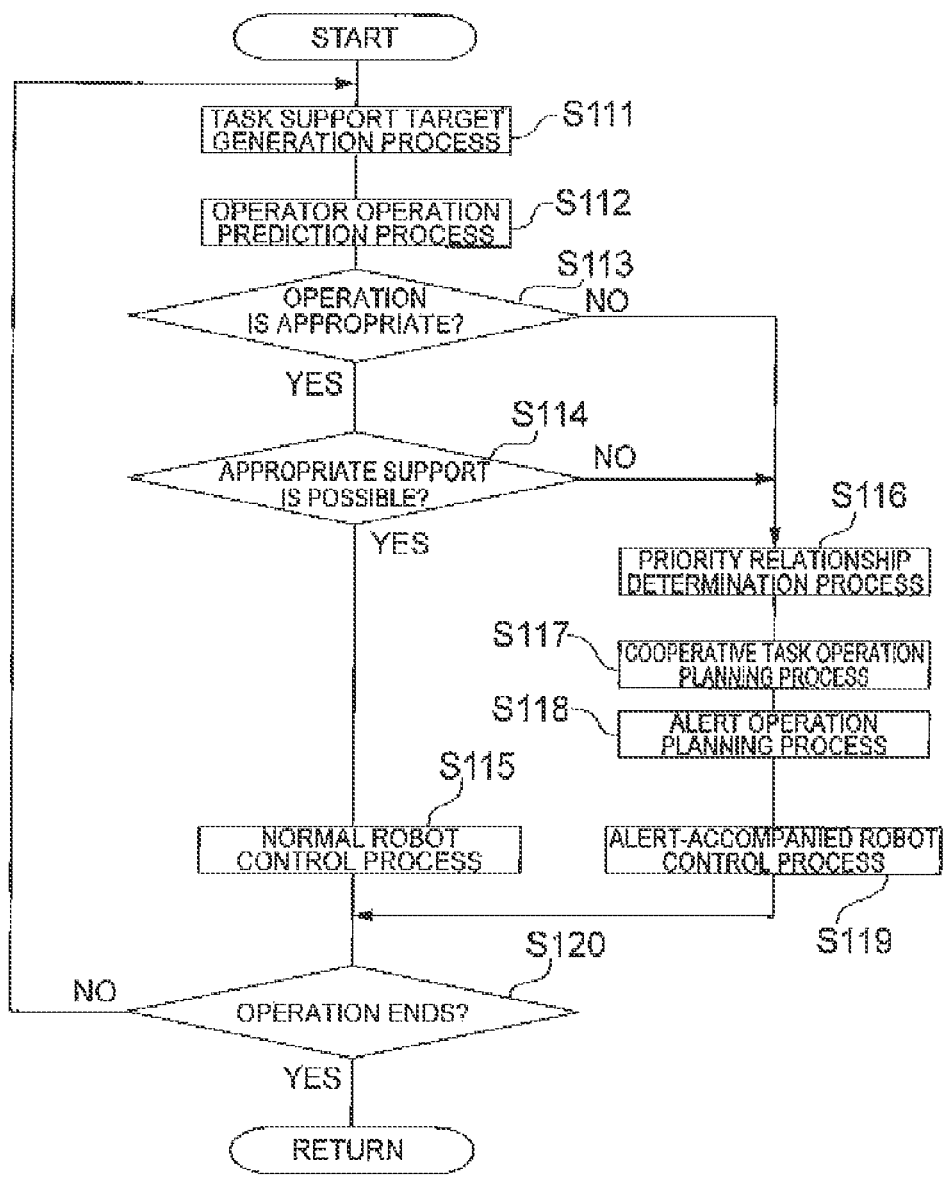
FIG. 14 is a flowchart showing a control procedure of a control device according to the seventh embodiment.

As shown in FIG. 14, in the control device 72, first, the task support target generation unit 76 performs a task support target generation process for generating the task support target (S111). Next, the operator operation prediction unit 77 predicts the operation of the operator on the basis of the image information of the operator-use fixed camera 74 and the contact state information of the contact sensor 75 (S112).

Thereafter, the operator operation determination unit 81 compares the operation predicted by the operator operation prediction unit 77 with the database, which stores the standard task, to determine whether or not the operation of the operator has an appropriate task content (S113). When it is determined that the operation of the operator has an appropriate task content, the operator operation determination unit 81 determines whether or not an appropriate support can be provided for the operation of the operator on the basis of the task support target generated by the task support target generation unit 76 and the operation predicted by the operator operation prediction unit 77 (S114). When it is determined that an appropriate support can be provided for the operation of the operator, the operator operation determination unit 81 progresses to Step S115.

In Step S115, the movement control unit 79 performs a normal robot control process for controlling the posture of the manipulator robot 71 along the task support target generated by the task support target generation unit 76.

In Step S113, when the operator operation determination unit 81 determines that the operation of the operator does not have an appropriate task content, or in Step S114, when it is determined that an appropriate support cannot be provided for the operation of the operator, the priority relationship determination unit 82 performs a priority relationship determination process for determining the priority relationship between the human and the manipulator robot 71 (S116).

Subsequently, the cooperative task operation planning unit 83 performs a cooperative task operation planning process for planning the cooperative task operation on the basis of the determination result of the priority relationship determination unit 82, the task support target generated by the task support target generation unit 76, and the operation predicted by the operator operation prediction unit 77 (S117). The cooperative task operation planning unit 83 plans the support operation as the cooperative task operation and the expected operation which is expected of the operator. Subsequently, the alert operation planning unit 84 performs an alert operation planning process for planning the alert operation, which leads the operator to perform an operation following the standard task or an operation to be supported by the task support of the manipulator robot 71, on the basis of the determination result of the priority relationship determination unit 82 and the expected operation planned by the cooperative task operation planning unit 83 (S118).

In Step S119, the movement control unit 79 and the alert control unit 80 perform an alert-accompanied robot control process for realizing the cooperative task operation. In the alert-accompanied robot control process, the movement control unit 79 performs the posture control of the manipulator robot 71 on the basis of the support operation planned by the cooperative task operation planning unit 83. The alert control unit 80 controls the manipulator robot 71 or an external audio device on the basis of the alert operation planned by the alert operation planning unit 84 so as to execute the alert operation.

Subsequently, the control device 72 determines whether or not the task support target is attained and the operation of the manipulator robot 71 ends (S120). When it is determined that the operation of the manipulator robot 71 does not end, the control device 72 repeats the process from Step S111. When it is determined that the operation of the manipulator robot 71 ends, the control device 72 ends the control.

According to the manipulator robot 71 of the seventh embodiment, when the operator performs an operation different from a plan, the alert operation is performed such that a correct task method is performed, whereby product failure or task missing can be reduced. Even if an individual operator uses an easy-to-operate task method, the operation of the operator is led such that the manipulator robot 71 can provide the task support, whereby an efficient cooperative task can be realized and production efficiency in the cell production system can be improved.

Eighth Embodiment

In an eighth embodiment, description will be provided using an automobile 91 as the mobile body of the invention. The automobile 91 is a vehicle which has an automatic driving function of performing automatic driving to a set destination. The automobile 91 is largely different from the autonomous mobile robot 1 in that contact between a pedestrian and the automobile is not permitted. For this reason, the automobile 91 plans a concessional operation so as not to come into contact with the pedestrian. The automobile 91 plans an alert operation to the pedestrian using non-contact communication by voice or light.

The priority relationship between the automobile 91 and the pedestrian basically places priority on the pedestrian. However, the priority relationship is changed depending on road circumstances, the state of the pedestrian, and surrounding circumstances, whereby the automobile 91 which is being automatically driven can pass through an environment in which the pedestrian is present. Specifically, when a pedestrian is walking away from a side of a road, when a plurality of pedestrians are walking next to each other, when a pedestrian is walking on a roadway of a road having a sidewalk, or the like, and when the pedestrian stands in the way of the safe passage of the automobile 91, the priority of the pedestrian is slightly lowered and an alert is performed to urge the movement of the pedestrian, whereby a safe passage can be secured. When a pedestrian is an old person or a child, or when a pedestrian pushes a wheelchair or a baby carriage, or carries a large load, it is determined that the pedestrian has high priority, and no alert is performed or a low-key alert is only performed, and the automobile 91 travels after the pedestrian moves to a safe position. When the automobile 91 is an emergency vehicle or the like, it is determined that the automobile 91 has high priority, and an avoidance direction is transmitted to the pedestrian by a positive alert, whereby the pedestrian can walk safely while making way for the automobile 91 even at a congested location.

Figure 15:
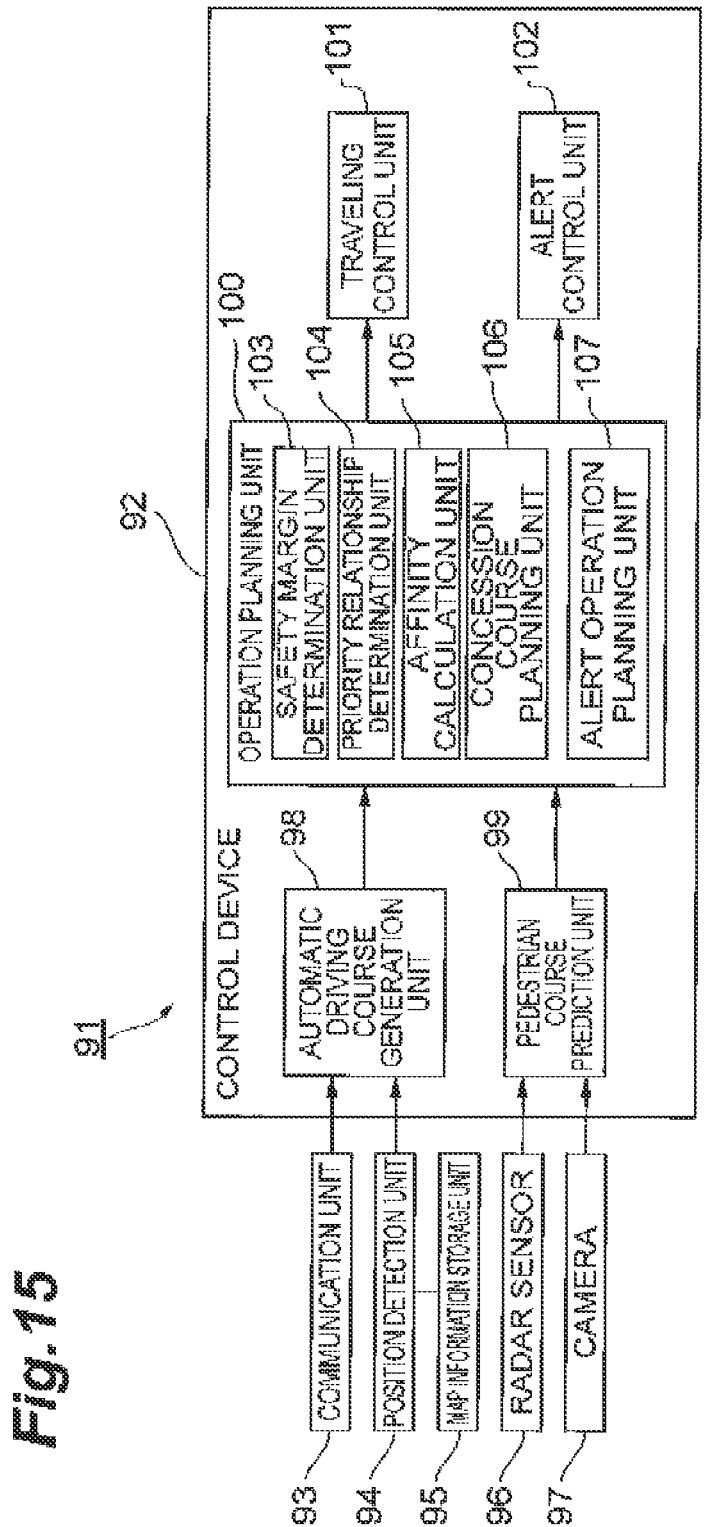
FIG. 15 is a block diagram showing the configuration of an eighth embodiment of a mobile body according to the invention.

As shown in FIG. 15, the automobile 91 includes a control device 92 which performs overall control. The control device 92 is connected to a communication unit 93, a position detection unit 94, a map information storage unit 95, a radar sensor 96, and a camera 97.

The communication unit 93 receives an automatic driving course plan relating to automatic driving through wireless communication with an external management center. The communication unit 93 transmits the received automatic driving course plan to the control device 92. The position detection unit 94 receives GPS signals to detect the present location of the automobile 91. The position detection unit 94 recognizes the present location of the automobile 91 on the basis of map information stored in the map information storage unit 95. The position detection unit 94 transmits the present location information of the automobile 91 and map information in the periphery of the present location to the control device 92.

The radar sensor 96 detects an obstacle in the periphery of the automobile 91 by reflected waves of emitted electric waves. The radar sensor 96 transmits position information of the detected obstacle to the control device 92. The camera 97 images the periphery of the automobile 91. The camera 97 transmits image information of the periphery of the automobile 91 to the control device 92.

The control device 92 has an automatic driving course generation unit 98, a pedestrian course prediction unit 99, an operation planning unit 100, a traveling control unit 101, and an alert control unit 102.

The automatic driving course generation unit 98 generates an automatic driving course on the basis of the automatic driving course plan of the communication unit 93 and the present location information of the automobile 91 and the map information in the periphery of the present location of the position detection unit 94. The pedestrian course prediction unit 99 determines whether or not a pedestrian is detected in the periphery on the basis of the position information of the obstacle of the radar sensor 96 and the image information of the camera 97. When it is determined that a pedestrian is detected, the pedestrian course prediction unit 99 predicts the course of the detected pedestrian on the basis of the position information of the obstacle of the radar sensor 96 and the image information of the camera 97.

The operation planning unit 100 has a safety margin determination unit 103, a priority relationship determination unit 104, an affinity calculation unit 105, a concession course planning unit 106, and an alert operation planning unit 107.

The safety margin determination unit 103 determines whether or not the safety margin such that the pedestrian does not interfere with the course of the automobile 91 can be secured on the basis of the automatic driving course generated by the automatic driving course generation unit 98 and the course of the pedestrian predicted by the pedestrian course prediction unit 99.

When the safety margin determination unit 103 determines that the safety margin cannot be secured, the priority relationship determination unit 104 determines the priority relationship between the pedestrian and the automobile 91. The priority relationship determination unit 104 determines the priority relationship between the pedestrian and the automobile 91 on the basis of the position information of the obstacle of the radar sensor 96 and the image information of the camera 97. When the pedestrian interferes with the safe passage of the automobile 91, the priority relationship determination unit 104 determines that the pedestrian has low priority. When the automobile 91 is in an emergency state, the priority relationship determination unit 104 determines that the automobile 91 has high priority.

The affinity calculation unit 105 calculates the affinity of the pedestrian for the automobile 91. The affinity calculation unit 105 calculates the affinity on the basis of the image information of the camera 97. The affinity calculation unit 105 calculates the affinity on the basis of the type of the automobile 91, the apparent size, or the like. Specifically, when the automobile 91 is a heavy truck or a bus, the affinity calculation unit 105 calculates the affinity to be low. When the automobile 91 is a compact car, the affinity calculation unit 105 calculates the affinity to be high.

The concession course planning unit 106 plans a concession course on the basis of the determination result of the priority relationship determination unit 104, the affinity calculated by the affinity calculation unit 105, the automatic driving course generated by the automatic driving course generation unit 98, and the course of the pedestrian predicted by the pedestrian course prediction unit 99. The concession course planning unit 106 plans, as the concession course, an avoidance course of the automobile 91 and an expected avoidance course which is expected of the pedestrian.

The alert operation planning unit 107 plans an alert operation, which leads the pedestrian to the expected avoidance course, on the basis of the expected avoidance course planned by the concession course planning unit 106, the determination result of the priority relationship determination unit 104, and the affinity calculated by the affinity calculation unit 105.

The traveling control unit 101 automatically drives the automobile 91 on the basis of the avoidance course planned by the concession course planning unit 106. The alert control unit 102 executes the alert operation to the pedestrian by voice or light on the basis of the alert operation planned by the alert operation planning unit 107.

Next, a control procedure of the control device 92 of the eighth embodiment will be described.

Figure 16:
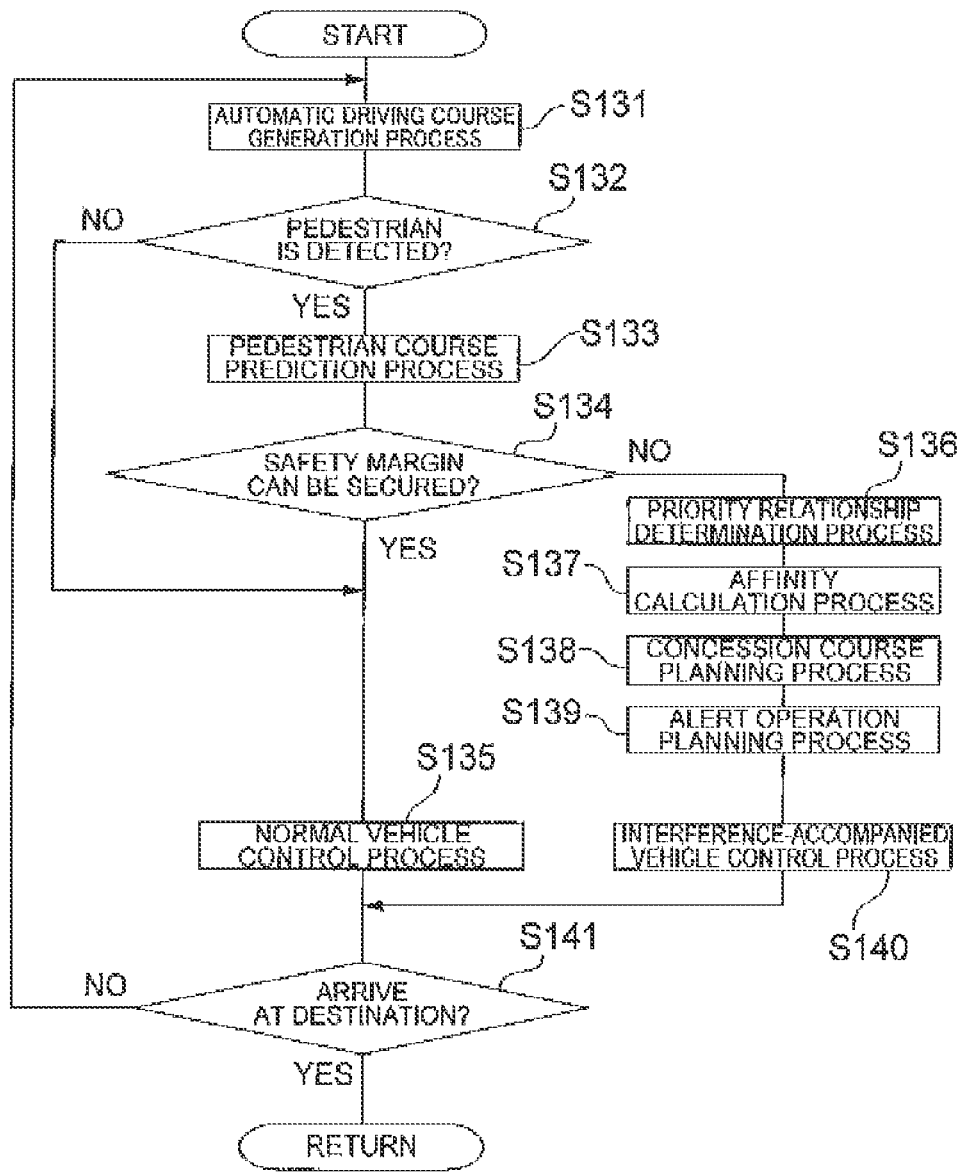
FIG. 16 is a flowchart showing a control procedure of a control device according to the eighth embodiment.

As shown in FIG. 16, in the control device 92, first, the automatic driving course generation unit 98 performs an automatic driving course generation process for generating the automatic driving course (S131). Next, the pedestrian course prediction unit 99 determines whether or not a pedestrian is detected in the periphery on the basis of the position information of the obstacle of the radar sensor 96 and the image information of the camera 97 (S132). When it is determined that no peripheral pedestrian is detected, the pedestrian course prediction unit 99 progresses to Step S135. When it is determined that a peripheral pedestrian is detected, the pedestrian course prediction unit 99 performs a pedestrian course prediction process for predicting the course of the pedestrian (S133).

Thereafter, the safety margin determination unit 103 determines whether or not the safety margin such that the pedestrian does not interfere with the course of the automobile 91 on the basis of the automatic driving course generated by the automatic driving course generation unit 98 and the course of the pedestrian predicted by the pedestrian course prediction unit 99 can be secured (S134). When it is determined that the safety margin can be secured, the safety margin determination unit 103 progresses to Step S135.

In Step S135, the traveling control unit 101 performs a normal vehicle control process for automatically driving the automobile 91 along the automatic driving course generated by the automatic driving course generation unit 98.

In Step S134, when the safety margin determination unit 103 determines that the safety margin cannot be secured due to course interference, the priority relationship determination unit 104 determines the priority relationship between the pedestrian and the automobile 91 (S136). Thereafter, the affinity calculation unit 105 calculates the affinity of the pedestrian for the automobile 91. The affinity calculation unit 105 calculates the affinity on the basis of the image information of the camera 97 (S137).

Subsequently, the concession course planning unit 106 performs a concession course planning process for planning the concession course on the basis of the determination result of the priority relationship determination unit 104, the affinity calculated by the affinity calculation unit 105, the automatic driving course generated by the automatic driving course generation unit 98, and the course of the pedestrian predicted by the pedestrian course prediction unit 99 (S138).

The alert operation planning unit 107 performs an alert operation planning process for planning the alert operation, which leads the pedestrian to the expected avoidance route, on the basis of the expected avoidance course planned by the concession course planning unit 106, the determination result of the priority relationship determination unit 104, and the affinity calculated by the affinity calculation unit 105 (S139).

In Step S140, the traveling control unit 101 and the alert control unit 102 perform an interference-accompanied vehicle control process for realizing concessions. In the interference-accompanied vehicle control process, the traveling control unit 101 performs automatic driving on the basis of the avoidance course of the automobile 91 planned by the concession course planning unit 106. The alert control unit 102 controls a speaker or a light of the automobile 91 on the basis of the alert operation planned by the alert operation planning unit 107 so as to execute the alert operation by voice or light.

Thereafter, the control device 92 determines whether or not the automatic driving of the automatic driving course ends and the automobile arrives at the destination (S141). When it is determined that the automobile does not arrive at the destination, the control device 92 repeats the process from Step S131. When it is determined that the automobile arrives at the destination, the control device 92 ends the control.

According to the automobile 91 of the eighth embodiment, concessions with the pedestrian are made, whereby the pedestrian can walk safely while making way for the automobile even in a congested environment. The course is planned taking into consideration the priority relationship or affinity, whereby an appropriate course according to the circumstances of the pedestrian and the automobile 91 can be planned while giving the pedestrian as little a sense of unease as possible.

Ninth Embodiment

In a ninth embodiment, description will be provided using a personal mobility device 111 as the mobile body of the invention. The personal mobility device 111 is a single passenger robot on which a human gets and performs a driving operation.

It is assumed that the personal mobility device travels at a place, such as a sidewalk or inside a building, where a pedestrian mainly passes through. However, in a congested environment, there is a problem in that it is not simple to allow the personal mobility device to travel so as not to become a nuisance to the periphery, and a certain degree of driving skill is required. Accordingly, in the personal mobility device 111, a concessional operation is realized, whereby the safe movement of even a person who is not trained in driving can be realized in a congested environment.

Figure 17:
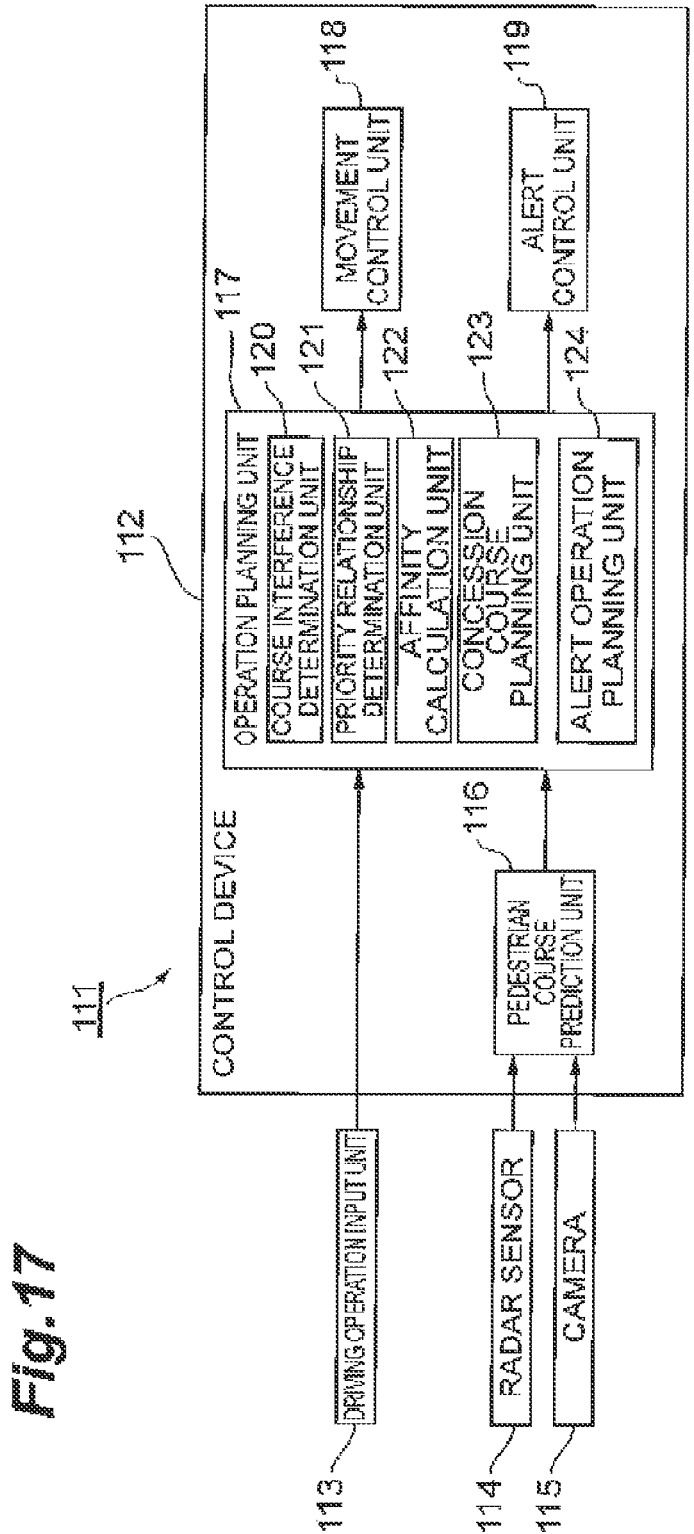
FIG. 17 is a block diagram showing the configuration of a ninth embodiment of a mobile body according to the invention.

As shown in FIG. 17, the personal mobility device 111 includes a control device 112 which performs overall control. The control device 112 is connected to a driving operation input unit 113, a radar sensor 114, and a camera 115.

The driving operation input unit 113 is a device which is used when a driver inputs a driving operation to the personal mobility device 111. The driving operation input unit 113 is constituted by, for example, a joystick, a handle, a switch, or a pedal. The driving operation input unit 113 outputs a driving operation of the driver to the control device 112. A case where the driver does not get on the personal mobility device 111 is considered, and in this case, remote operation is performed through communication using a remote control device or the like. In the ninth embodiment, the personal mobility device 111 moves using a driving operation input as an operation target.

The radar sensor 114 detects an obstacle in the periphery of the personal mobility device 111 by reflected waves of emitted electric waves. The radar sensor 114 transmits position information of the detected obstacle to the control device 112. The camera 115 images the periphery of the personal mobility device 111. The camera 115 transmits image information of the periphery to the control device 112.

The control device 112 has a pedestrian course prediction unit 116, an operation planning unit 117, a movement control unit 118, and an alert control unit 119.

The pedestrian course prediction unit 116 determines whether or not a peripheral pedestrian is detected on the basis of the position information of the obstacle of the radar sensor 114 and the image information of the camera 115. When it is determined that the peripheral pedestrian is detected, the pedestrian course prediction unit 116 predicts the course of the pedestrian on the basis of the position information of the obstacle of the radar sensor 114 and the image information of the camera 115.

The operation planning unit 117 has a course interference determination unit 120, a priority relationship determination unit 121, an affinity calculation unit 122, a concession course planning unit 123, and an alert operation planning unit 124. The course interference determination unit 120 determines whether or not the pedestrian interferes with (crosses or approaches) the course of the personal mobility device 111 on the basis of the driving operation output from the driving operation input unit 113 and the course of the pedestrian predicted by the pedestrian course prediction unit 116.

When the course interference determination unit 120 determines that the pedestrian interferes with the course of the personal mobility device 111, the priority relationship determination unit 121 determines the priority relationship between the pedestrian and the personal mobility device 111. The priority relationship determination unit 121 determines the priority relationship on the basis of the position information of the obstacle of the radar sensor 114 and the image information of the camera 115. The personal mobility device 111 may be provided with a selector switch or an adjustment knob which inputs the degree of urgency of the driver to the control device 112. In this case, the priority relationship determination unit 121 determines the priority relationship on the basis of the input degree of urgency. The affinity calculation unit 122 calculates the affinity of the pedestrian for the personal mobility device 111 on the basis of the image information of the camera 115.

The concession course planning unit 123 plans a concession course on the basis of the determination result of the priority relationship determination unit 121, the affinity calculated by the affinity calculation unit 122, the driving operation output from the driving operation input unit 113, and the course of the pedestrian predicted by the pedestrian course prediction unit 116. The concession course planning unit 123 plans, as the concession course, an avoidance course of the personal mobility device 111 and an expected avoidance course which is expected of the pedestrian.

The alert operation planning unit 124 plans an alert operation, which leads the pedestrian to the expected avoidance course, on the basis of the expected avoidance course planned by the concession course planning unit 123, the determination result of the priority relationship determination unit 121, and the affinity calculated by the affinity calculation unit 122.

The movement control unit 118 controls the movement mechanism of the personal mobility device 111 on the basis of the avoidance course planned by the concession course planning unit 123. The alert control unit 119 executes the alert operation to the pedestrian by voice, light, or contact on the basis of the alert operation planned by the alert operation planning unit 124.

Next, a control procedure of the control device 112 of the ninth embodiment will be described.

Figure 18:
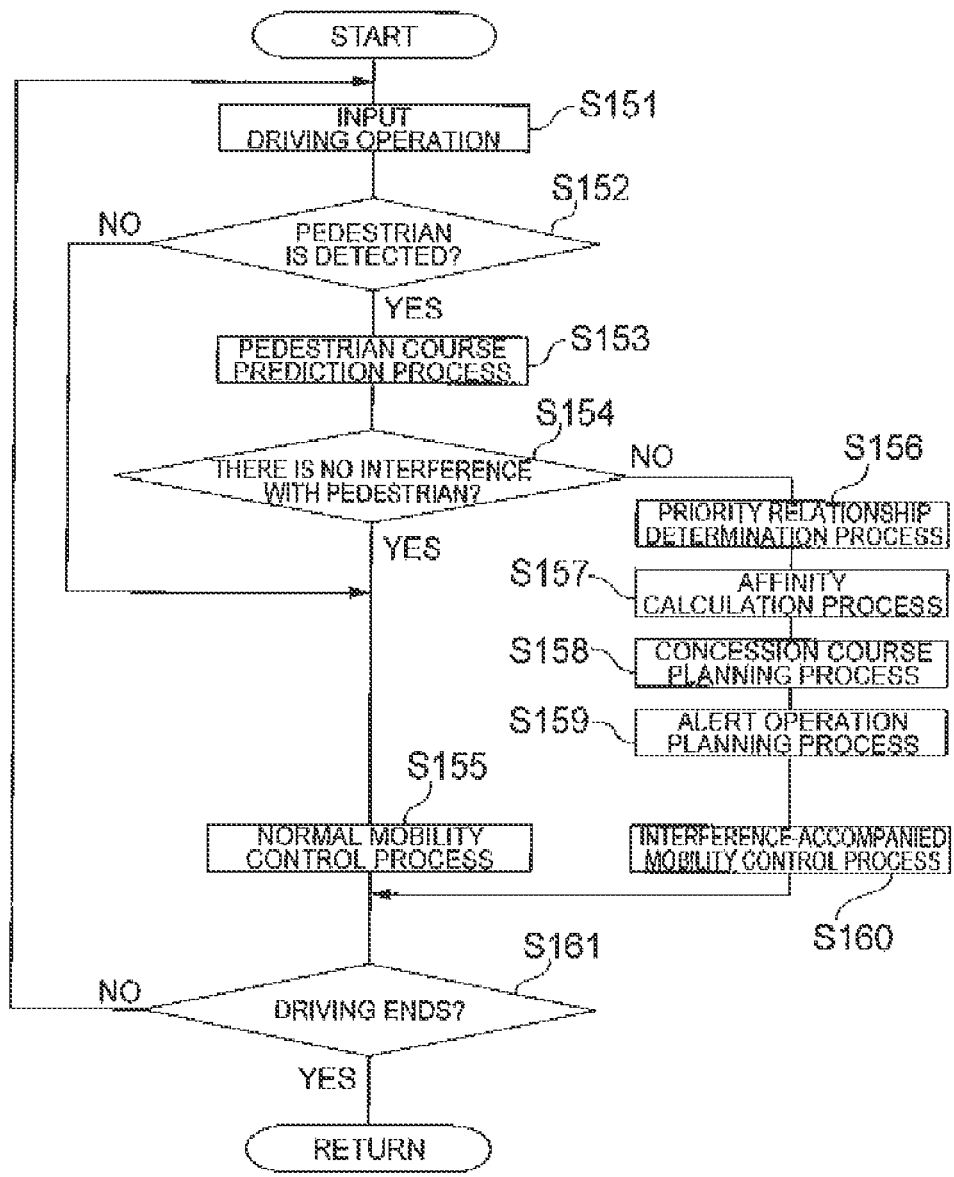
FIG. 18 is a flowchart showing a control procedure of a control device according to the ninth embodiment.

As shown in FIG. 18, in the control device 112, first, the driving operation of the driver is input from the driving operation input unit 113 (S151). Next, the pedestrian course prediction unit 116 determines whether or not a peripheral pedestrian is detected on the basis of the position information of the obstacle of the radar sensor 114 and the image information of the camera 115 (S152). When it is determined that no peripheral pedestrian is detected, the pedestrian course prediction unit 116 progresses to Step S155. When it is determined that a peripheral pedestrian is detected, the pedestrian course prediction unit 116 performs a pedestrian course prediction process for predicting the course of the pedestrian (S153).

Thereafter, the course interference determination unit 120 determines whether or not the pedestrian interferes with the course of the personal mobility device 111 on the basis of the driving operation output from the driving operation input unit 113 and the course of the pedestrian predicted by the pedestrian course prediction unit 116 (S154). When it is determined that there is no interference with the pedestrian, the course interference determination unit 120 progresses to Step S155.

In Step S155, the movement control unit 118 performs a normal mobility control process for controlling the movement mechanism of the personal mobility device 111 in accordance with the driving operation output from the driving operation input unit 113.

In Step S154, when the course interference determination unit 120 determines that there is inference with the pedestrian, the priority relationship determination unit 121 determines the priority relationship between the pedestrian and the personal mobility device 111 (S156). Thereafter, the affinity calculation unit 122 calculates the affinity of the pedestrian for the personal mobility device 111. The affinity calculation unit 122 calculates the affinity on the basis of the image information of the camera 115 (S157).

Subsequently, the concession course planning unit 123 performs a concession course planning process for planning the concession course on the basis of the determination result of the priority relationship determination unit 121, the affinity calculated by the affinity calculation unit 122, the driving operation output from the driving operation input unit 113, and the course of the pedestrian predicted by the pedestrian course prediction unit 116 (S158).

The alert operation planning unit 124 performs an alert operation planning process for planning the alert operation, which leads the pedestrian to the expected avoidance course, on the basis of the expected avoidance course planned by the concession course planning unit 123, the determination result of the priority relationship determination unit 121, and the affinity calculated by the affinity calculation unit 122 (S159).

In Step S160, the movement control unit 118 and the alert control unit 119 perform an interference-accompanied mobility control process for realizing concessions. In the interference-accompanied mobility control process, the movement control unit 118 controls the movement mechanism on the basis of the avoidance course of the personal mobility device 111 planned by the concession course planning unit 123. The alert control unit 119 executes the alert operation using communication by voice output, light output, or contact on the basis of the alert operation planned by the alert operation planning unit 124.

Thereafter, the control device 112 determines whether or not the driving of the personal mobility device 111 ends (S161). When it is determined that the driving does not end, the control device 112 repeats the process from Step S151. When it is determined that the driving ends, the control device 112 ends the control.

According to the personal mobility device 111 of the ninth embodiment, concessions with the pedestrian are made, whereby the pedestrian can walk safely while making way for the automobile even in a congested environment. The course is planned taking into consideration the priority relationship or affinity, whereby an appropriate course according to the circumstances of the pedestrian and the personal mobility device 111 can be planned while giving the pedestrian as little a sense of unease as possible.

Tenth Embodiment

Figure 19:
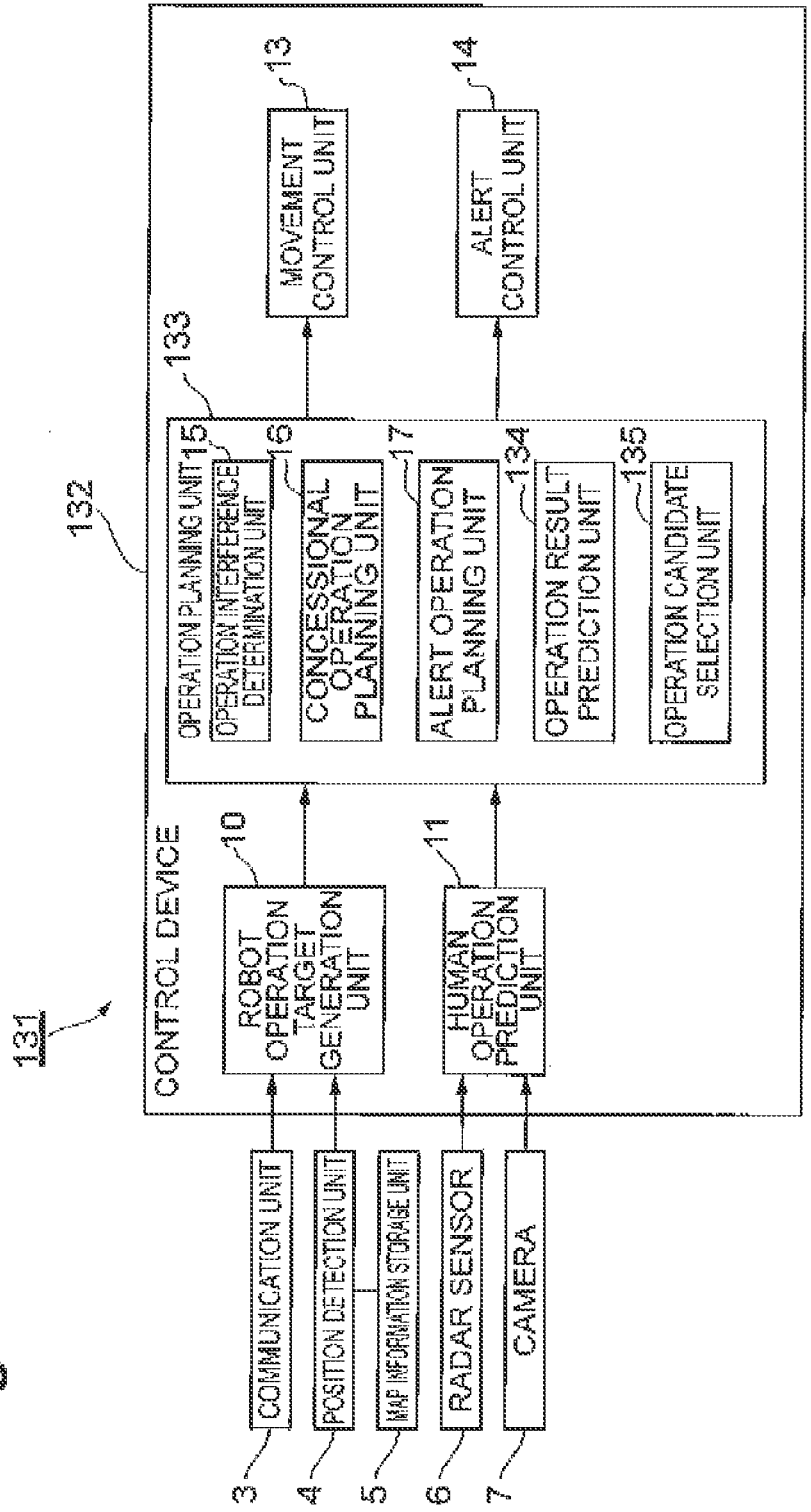
FIG. 19 is a block diagram showing the configuration of a tenth embodiment of a mobile body according to the invention.

As shown in FIG. 19, an autonomous mobile robot 131 of a tenth embodiment is mainly different from the autonomous mobile robot 1 of the first embodiment in that an operation result prediction unit 134 which predicts the operation results of a plurality of operation candidates is provided, and an operation candidate selection unit 135 which selects an operation candidate, for which it is predicted that a predetermined constraint condition will be satisfied, from among a plurality of operation candidates is provided.

A control device 132 of the autonomous mobile robot 131 of the tenth embodiment includes an operation planning unit 133 which has the operation result prediction unit 134 and the operation candidate selection unit 135. The operation result prediction unit 134 predicts the operation results when a plurality of planned operation candidates of the autonomous mobile robot 131 are performed in practice. The operation candidates of the autonomous mobile robot 131 are planned on the basis of the avoidance operation of the autonomous mobile robot 131 planned by the concessional operation planning unit 25 and the expected avoidance operation which is expected of the human. The operation candidates include the avoidance operation and the alert operation of the autonomous mobile robot 131.

The operation result prediction unit 134 predicts the operation results using a human movement model (including a model of a way of movement for the alert operation of the robot 131). The operation result prediction unit 134 sets the position and speed as an initial condition for the robot 131 and the human crossing each other. Thereafter, the operation result prediction unit 134 predicts the operation results taking into consideration the acceleration of the robot 131 and the acceleration of the human 131 by a contact force of the alert operation to be given by the robot 131. The operation result prediction unit 134 repeats the prediction for a plurality of operation candidates which are different in the intensity (contact force) of the alert operation of the autonomous mobile robot 131 or are different in the parameters of the avoidance acceleration.

The operation candidate selection unit 135 determines whether or not the operation candidate for which it is predicted that the operation result will satisfy the predetermined constraint condition can be selected on the basis of the prediction of the operation results of the operation result prediction unit 134. Examples of the predetermined constraint condition includes the distance between the human and the robot 131, the intensity of an alert (the intensity of an alert by light or voice or the intensity of an alert by contact), and the like.

When it is determined that the operation candidate can be selected, the operation candidate selection unit 135 calculates an operation candidate having the maximum movement efficiency from among the operation candidates which are predicted that the predetermined constraint condition will be satisfied. Specifically, the operation candidate selection unit 135 evaluates the movement efficiency of the selectable operation candidate on the basis of the prediction of the operation results of the operation result prediction unit 134. The movement efficiency can be evaluated focusing on change in speed before and after concessions. Since the movement before concessions is maintained as change in speed is small before and after concessions, the operation candidate selection unit 135 evaluates the movement efficiency to be high.

The operation candidate selection unit 135 evaluates the movement efficiency of the human and the movement efficiency of the robot 131. The operation candidate selection unit 135 selects an operation candidate in which the sum of the movement efficiency of the human and the movement efficiency of the robot 131 is maximal.

Next, a control procedure of the control device 132 of the tenth embodiment will be described.

Figure 20:
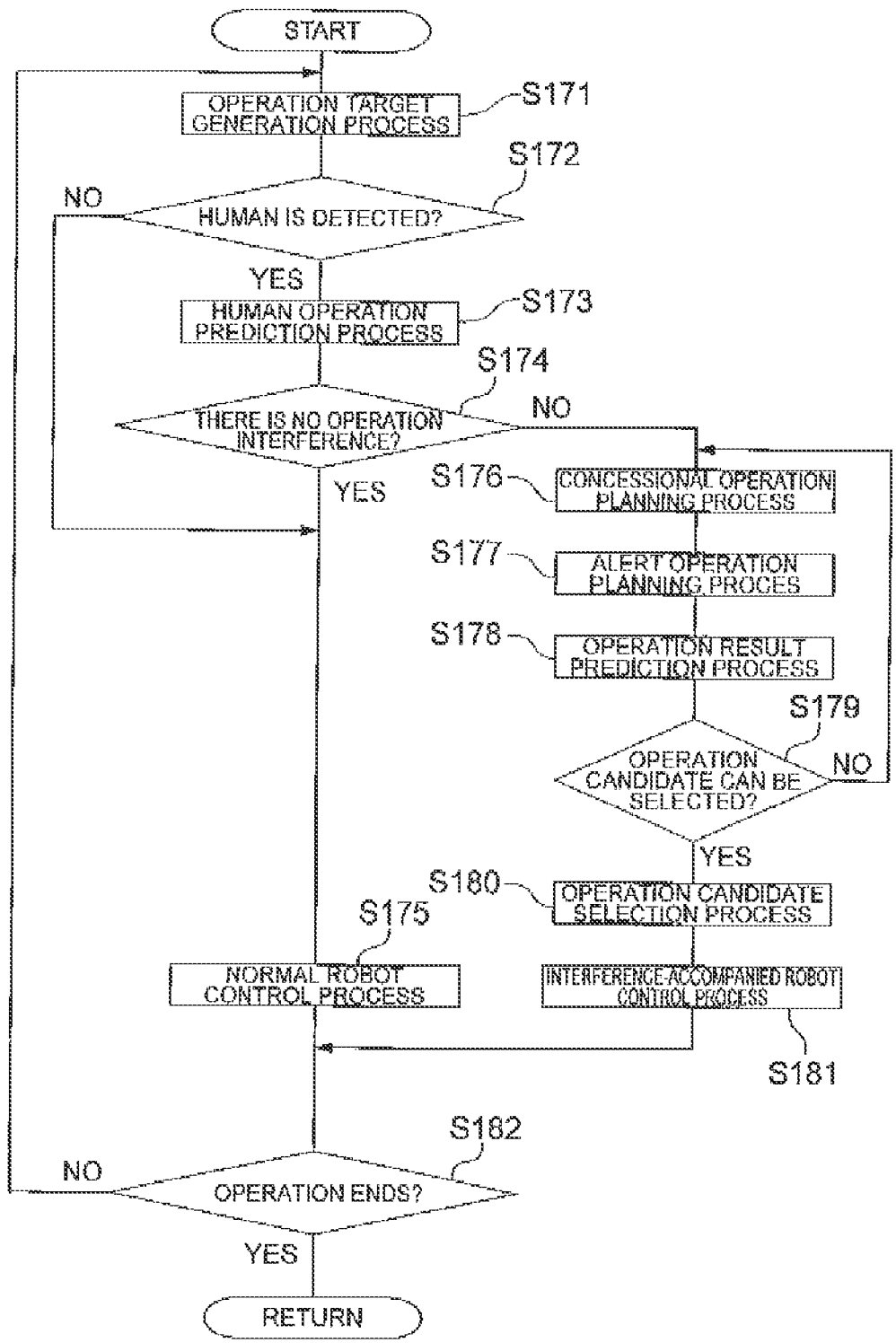
FIG. 20 is a flowchart showing a control procedure of a control device according to the tenth embodiment.

As shown in FIG. 20, in the control device 132, first, the robot operation target generation unit 10 performs an operation target generation process for generating the operation target (S171). Next, the human operation prediction unit 11 determines whether or not a human is detected in the periphery on the basis of the position information of the obstacle of the radar sensor 6 and the image information of the periphery of the robot of the camera 7 (S172). When it is determined that no human is detected, the human operation prediction unit 11 progresses to Step S175.

When it is determined that a human is detected, the human operation prediction unit 11 performs an operation prediction process for predicting the operation of the detected human (S173). Thereafter, the operation interference determination unit 15 determines whether or not the peripheral person interferes with the operation of the autonomous mobile robot 131 on the basis of the operation target of the robot operation target generation unit 10 and the operation of the human predicted by the human operation prediction unit 11 (S174). When it is determined that there is no operation interference, the operation interference determination unit 15 progresses to Step S175.

In Step S175, the movement control unit 13 performs a normal robot control process for controlling the movement mechanism of the autonomous mobile robot 131 along the operation target generated by the robot operation target generation unit 10.

In Step S174, when the operation interference determination unit 15 determines that there is operation interference, the concessional operation planning unit 25 performs a concessional operation planning process on the basis of the determination result of the priority relationship determination unit 24, the operation target generated by the robot operation target generation unit 10, and the operation of the human predicted by the human operation prediction unit 11 (S176). The concessional operation planning unit 25 plans, as the concessional operation, the avoidance operation of the autonomous mobile robot 131 and the expected avoidance operation which is expected of the human.

Subsequently, the alert operation planning unit 26 performs an alert operation planning process for planning the alert operation to the human on the basis of the determination result of the priority relationship determination unit 24 and the expected avoidance operation planned by the concessional operation planning unit 25 (S177). The operation candidate is the combination of the avoidance operation and the alert operation. The concessional operation planning unit 25 and the alert operation planning unit 26 plan a plurality of operation candidates from a plurality of avoidance operations and alert operations.

Thereafter, the operation result prediction unit 134 predicts the operation results when a plurality of planned operation candidates of the autonomous mobile robot 131 are performed in practice (S178). The operation result prediction unit 134 predicts the operation results using the human movement model (including the model of the way of movement to the alert operation of the robot 131).

Next, the operation candidate selection unit 135 determines whether or not the operation candidate for which it is predicted that the operation result will satisfy the predetermined constraint condition can be selected on the basis of the prediction of the operation results of the operation result prediction unit 134 (S179).

When there is no operation candidate for which it is predicted that the predetermined constraint condition will be satisfied, the operation candidate selection unit 135 determines that the operation candidate is not selectable. In this case, the process returns to Step S176, and a new operation candidate is created. When there is an operation candidate for which it is predicted that the predicted operation result will satisfy the predetermined constraint condition, the operation candidate selection unit 135 determines that the operation candidate is selectable.

When it is determined that the operation candidate is selectable, the operation candidate selection unit 135 selects an operation candidate having the maximum movement efficiency from among the operation candidates for which it is predicted that the predetermined constraint condition will be satisfied (S180). The operation candidate selection unit 135 evaluates the movement efficiencies of a plurality of operation candidates on the basis of the prediction of the operation results of the operation result prediction unit 134. The operation candidate selection unit 135 evaluates the movement efficiency of the human and the movement efficiency of the robot 131, and selects the operation result in which the sum of the movement efficiency of the human and the movement efficiency of the robot 131 is maximal.

Thereafter, in Step S181, the movement control unit 13 and the alert control unit 14 perform an interference-accompanied robot control process for realizing the concessional operation on the basis of the operation candidate selected by the operation candidate selection unit 135. In the interference-accompanied robot control process, the avoidance operation and the alert operation corresponding to the operation candidate selected by the operation candidate selection unit 135 are performed.

Thereafter, the control device 132 determines whether or not the operation target is attained and the operation of the autonomous mobile robot 131 ends (S182). When it is determined that the operation of the autonomous mobile robot 131 does not end, the control device 132 repeats the process from Step S131. When it is determined that the operation of the autonomous mobile robot 131 ends, the control device 132 ends the control.

According to the autonomous mobile robot 131 of the tenth embodiment, the operation candidate for which it is predicted that the predetermined constraint condition, such as an approach to the human or intensity of an alert, will be satisfied is selected from among a plurality of operation candidates, whereby it is possible to suppress an inappropriate operation in practice, for example, an alert being excessively intense.

Specifically, when it is expected that the human largely performs avoidance, an intense alert is required. Meanwhile, from the viewpoint of safety or a sense of ease, it is not preferable to execute an excessively intense alert operation. In the case of an alert by contact, if an alert is excessively intense, the human may feel pain or the body posture may become unstable. In the case of an alert by sound or light, if an alert is excessively intense, the stimulus may give the human a sense of extreme discomfort. When there is the possibility that an avoidance operation which can be expected of the human is small, the movement efficiency of the robot 131 is degraded.

Accordingly, in the autonomous mobile robot 131 of the tenth embodiment, a searching method which selects an operation candidate satisfying a predetermined constraint condition and having high movement efficiency from among a plurality of operation candidates is used, whereby a concessional operation which has high movement efficiency and can be realized in practice can be executed.

The invention is not limited to the foregoing embodiments.

For example, the mobile body of the invention is not limited to an autonomous mobile robot, a manipulator, an automobile, and a personal mobility device. The mobile body is not necessarily limited to a mobile body which moves above ground, and may be a mobile body which moves in the air or under water.

As a region which is used when the robot comes into contact with the human as an alert, only a palm portion may be used. This is because, in the case of contact by the palm portion, the contact state can be detected by each sensor with high accuracy compared to contact by other regions. The contact by the palm portion is excellent in that impact can be reduced using a flexible coating of the palm portion or a passive flexible mechanism of an arm portion.

Although in the foregoing embodiments, a case where an operation is performed for the human as the other party, the invention can be suitably applied to parties other than the human. That is, the mobile obstacle described in the appended claims includes an animal, such as a dog, a mobility device, such as an automobile, or other robots, in addition to the human.

INDUSTRIAL APPLICABILITY

The invention can be used for a mobile body, such as a robot, a manipulator, or a mobility device.

REFERENCE SIGNS LIST

1, 21, 31, 41, 51, 61, 131: autonomous mobile robot (mobile body), 2, 22, 32, 42, 52, 62, 72, 92, 112, 132: control device, 6, 96, 114: radar sensor (mobile obstacle detection means), 7, 97, 115: camera (mobile obstacle detection means), 10: robot operation target generation unit (operation target generation means), 11: human operation prediction unit (operation prediction means), 12, 23, 34, 43, 53, 63, 78, 100, 117, 133: operation planning unit (operation planning means), 15: operation interference determination unit (approach determination means), 16, 25, 36, 46, 55, 65: concessional operation planning unit, 17, 26, 37, 47, 56, 66, 84, 100, 107, 124: alert operation planning unit (alert operation planning means), 24, 44, 64, 82, 104, 121: priority relationship determination unit (priority relationship determination means), 35, 45: contact tolerance calculation unit (contact tolerance calculation means), 54, 105, 122: affinity calculation unit (affinity calculation means), 71: manipulator robot (mobile body), 74: operator-use fixed camera (mobile obstacle detection means), 76: task support target generation unit (operation target generation means), 77: operator operation prediction unit (operation prediction means), 81: operator operation determination unit (approach determination means), 83: cooperative task operation planning unit (operation planning means), 91: automobile (mobile body), 98: automatic driving course generation unit (operation target generation means), 99, 116: pedestrian course prediction unit (operation prediction means), 103: safety margin determination unit (approach determination means), 106, 123: concession course planning unit (operation planning means), 111: personal mobility device (mobile body), 120: course interference determination unit (approach determination means), 134: operation result prediction unit, 135: operation candidate selection unit

The invention claimed is:

1. A mobile body which moves on the basis of an operation target, the mobile body comprising:
    at least one memory operable to store program code;
    at least one processor operable to read said program code and operate as instructed by said program code, said program code including:
    a mobile obstacle detector that detects a mobile obstacle in the vicinity of the mobile body;
    an operation predictor that predicts future operation of the mobile obstacle, on the basis of detection results from the mobile obstacle detector;
    approach determination code that determines whether or not the mobile obstacle and the mobile body approach each other within a predetermined interval; and
    operation planning code that, when the approach determination code determines that the mobile obstacle and the mobile body approach each other within the predetermined interval, plans an avoidance operation of the mobile body and predicts an expected avoidance operation which is expected of the mobile obstacle, on the basis of the operation of the mobile obstacle predicted by the operation predictor and the operation target of the mobile body,
    wherein the expected avoidance operation is an operation that can be expected of the mobile obstacle to conduct so as to avoid an approach to or contact with the mobile body.

2. The mobile body according to claim 1, further comprising:
    alert operation planning code that plans an alert operation to the mobile obstacle on the basis of the expected avoidance operation predicted by the operation planning code.

3. The mobile body according to claim 2, further comprising:
    contact tolerance calculation code that calculates a contact tolerance of the mobile body with respect to the mobile obstacle,
    wherein the alert operation planning code plans an alert operation including a contact operation to the mobile obstacle on the basis of the contact tolerance calculated by the contact tolerance calculation code.

4. The mobile body according to claim 2, further comprising:
    priority relationship determination code that, when the approach determination code determines that the mobile obstacle and the mobile body approach each other within the predetermined interval, determines the priority relationship between the mobile obstacle and the mobile body,
    wherein the alert operation planning code plans the alert operation to the mobile obstacle on the basis of the determination result of the priority relationship determination code.

5. The mobile body according to claim 2, further comprising:
    affinity calculation code that, when the mobile obstacle is a human, calculates an affinity of the human for the mobile body,
    wherein the alert operation planning code plans the alert operation to the mobile obstacle on the basis of the affinity calculated by the affinity calculation code.

6. The mobile body according to claim 2, further comprising:
    contact tolerance calculation unit for calculating contact tolerance of the mobile body with respect to the mobile obstacle,
    wherein the alert operation planning code plans an alert operation including a contact operation to the mobile obstacle on the basis of the contact tolerance calculated by the contact tolerance calculation unit.

7. The mobile body according to claim 1, further comprising:
    contact tolerance calculation code that calculates a contact tolerance of the mobile body with respect to the mobile obstacle,
    wherein the operation planning code plans the avoidance operation of the mobile body and predicts the expected avoidance operation which is expected of the mobile obstacle on the basis of the contact tolerance calculated by the contact tolerance calculation code.

8. The mobile body according to claim 7, further comprising:
    priority relationship determination code that when the approach determination code determines that the mobile obstacle and the mobile body approach each other within the predetermined interval, determines the priority relationship between the mobile obstacle and the mobile body,
    wherein the contact tolerance calculation code calculates the contact tolerance on the basis of the determination result of the priority relationship determination code.

9. The mobile body according to claim 1, further comprising:
    priority relationship determination code that, when the approach determination code determines that the mobile obstacle and the mobile body approach each other within the predetermined interval, determines the priority relationship between the mobile obstacle and the mobile body,
    wherein the operation planning code plans the avoidance operation of the mobile body and predicts the expected avoidance operation which is expected of the mobile obstacle on the basis of the determination result of the priority relationship determination code.

10. The mobile body according to claim 1, further comprising:
    affinity calculation code that when the mobile obstacle is a human, calculates an affinity of the human for the mobile body,
    wherein the operation planning code plans the avoidance operation of the mobile body and predicts the expected avoidance operation which is expected of the human on the basis of the affinity calculated by the affinity calculation code.

11. The mobile body according to claim 1, further comprising:
operation target generation code that generates the operation target of the mobile body; and
operation prediction code that predicts the operation of the mobile obstacle detected by the mobile obstacle detector,
wherein the approach determination code determines whether or not the mobile obstacle and the mobile body approach each other within the predetermined interval on the basis of the operation target generated by the operation target generation code and the operation of the mobile obstacle predicted by the operation prediction code.

12. The mobile body according to claim 11,
wherein the operation planning code corrects the avoidance operation and the expected avoidance operation on the basis of the deviation between the planned avoidance operation and the operation target generated by the operation target generation code and the deviation between the predicted expected avoidance operation and the operation of the mobile obstacle predicted by the operation prediction code.

13. The mobile body according to claim 1,
wherein the operation planning code plans a plurality of operation candidates of the mobile body based on the avoidance operation of the mobile body and predicts the expected avoidance operation which is expected of the mobile obstacle, predicts the operation results of the plurality of operation candidates, and from among the plurality of operation candidates, selects an operation candidate for which it is predicted that the operation result will satisfy a predetermined constraint condition.

14. The mobile body according to claim 1,
wherein the mobile body is an autonomous mobile robot.

15. The mobile body according to claim 1,
wherein the mobile body is a manipulator robot.

16. The mobile body according to claim 1,
wherein the mobile body is a personal mobility device.

17. The mobile body according to claim 1, further comprising:
alert operation planning unit for planning an alert operation to the mobile obstacle on the basis of the expected avoidance operation predicted by the operation planning code.

18. The mobile body according to claim 1, further comprising:
contact tolerance calculation unit for calculating contact tolerance of the mobile body with respect to the mobile obstacle,
wherein the operation planning code plans the avoidance operation of the mobile body and predicts the expected avoidance operation which is expected of the mobile obstacle on the basis of the contact tolerance calculated by the contact tolerance calculation unit.

19. The mobile body according to claim 1, further comprising:
priority relationship determination unit for, when the approach determination code determines that the mobile obstacle and the mobile body approach each other within the predetermined interval, determining the priority relationship between the mobile obstacle and the mobile body,
wherein the operation planning code plans the avoidance operation of the mobile body and predicts the expected avoidance operation which is expected of the mobile obstacle on the basis of the determination result of the priority relationship determination unit.

20. The mobile body according to claim 1, further comprising:
a concessional operation planning code that corrects the avoidance operation and the expected avoidance operation on the basis of a deviation between the planned avoidance operation and the operation target generated by a robot operation target generation code and a deviation between a predicted expected avoidance operation and an operation of a human predicted by a human operation prediction code.

21. The mobile body according to claim 1, further comprising:
a human operation prediction code that recognizes a traveling direction and a speed of a human on the basis of positional information obtained by the mobile body and predicting a future operation of the human when maintaining a traveling direction and movement speed,
wherein if an operational interference is determined between the human and the mobile body a concessional operation is planned based on an avoidance operation of the robot and a predicted avoidance operation of the human; and
the mobile body executes an alert operation and an avoidance operation based on the predicted avoidance operation of the human.

22. A mobile body which moves on the basis of an operation target, the mobile body comprising:
a mobile obstacle detection unit for detecting a mobile obstacle in the vicinity of the mobile body;
at least one memory operable to store program code;
at least one processor operable to read said program code and operate as instructed by said program code, said program code including:
an operation predictor that predicts future operation of the mobile obstacle, on the basis of detection results from the mobile obstacle detection unit;
approach determination unit for determining whether or not the mobile obstacle and the mobile body approach each other within a predetermined interval; and
operation planning unit for, when the approach determination unit determines that the mobile obstacle and the mobile body approach each other within the predetermined interval, plans an avoidance operation of the mobile body and predicts an expected avoidance operation which is expected of the mobile obstacle, on the basis of the operation of the mobile obstacle predicted by the operation predictor and the operation target of the mobile body,
wherein the expected avoidance operation is an operation that can be expected of the mobile obstacle to conduct so as to avoid an approach to or contact with the mobile body.

* * * * *